US012082701B2

(12) United States Patent
Lachenbruch et al.

(10) Patent No.: US 12,082,701 B2
(45) **Date of Patent: *Sep. 10, 2024**

(54) TOPPER WITH TARGETED FLUID FLOW DISTRIBUTION

(71) Applicant: Hill-Rom Services, Inc., Batesville, IN (US)

(72) Inventors: Charles A. Lachenbruch, Batesville, IN (US); Rachel L. Williamson, Batesville, IN (US); Timothy J. Receveur, Apex, NC (US); Christopher R. O'Keefe, Columbus, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/687,831

(22) Filed: Mar. 7, 2022

(65) Prior Publication Data

US 2022/0183474 A1 Jun. 16, 2022

Related U.S. Application Data

(63) Continuation of application No. 16/863,037, filed on Apr. 30, 2020, now Pat. No. 11,278,125, which is a
(Continued)

(51) Int. Cl.

| | |
|---|---|
| *A47C 21/04* | (2006.01) |
| *A47C 27/00* | (2006.01) |

(Continued)

(52) U.S. Cl.
CPC ............ *A47C 21/044* (2013.01); *A47C 27/00* (2013.01); *A47C 27/05* (2013.01); *A47C 31/02* (2013.01);
(Continued)

(58) Field of Classification Search
CPC ..... A47C 27/04; A47C 27/044; A47C 27/048; A47C 27/00; A47C 27/05; A47C 31/02; A47C 21/044; A47C 21/04; A47C 21/042; A47C 21/048; A61G 7/05784; A61G 2210/70
See application file for complete search history.

(56) References Cited

U.S. PATENT DOCUMENTS

| | | | |
|---|---|---|---|
| 2,641,432 | A | 2/1949 | Mitchell |
| 2,826,244 | A | 3/1958 | Hurley |

(Continued)

FOREIGN PATENT DOCUMENTS

| | | | |
|---|---|---|---|
| EP | 1151698 | A2 | 11/2001 |
| EP | 870449 | A2 | 7/2003 |

(Continued)

*Primary Examiner* — Justin C Mikowski
*Assistant Examiner* — Amanda L Bailey
(74) *Attorney, Agent, or Firm* — Barnes & Thornburg LLP

(57) ABSTRACT

A topper (38) for a bed extends in longitudinal and lateral directions and includes a fluid flowpath (60) for channeling fluid through the topper from an inlet (62) to an outlet (64). The flowpath is configured to distribute the fluid to a preferred target region (50) of the topper. A bed which includes the topper has a blower (72) connected to the topper inlet for supplying air (88) to the flowpath.

20 Claims, 20 Drawing Sheets

Related U.S. Application Data continuation of application No. 14/969,284, filed on Dec. 15, 2015, now abandoned, which is a continuation of application No. 13/401,401, filed on Feb. 21, 2012, now abandoned.

(51) Int. Cl.
*A47C 27/05* (2006.01)
*A47C 31/02* (2006.01)
*A61G 7/057* (2006.01)

(52) U.S. Cl.
CPC ...... *A61G 7/05784* (2016.11); *A61G 2210/70* (2013.01)

(56) References Cited

U.S. PATENT DOCUMENTS 3,735,559 A 5/1973 Salemme
4,185,341 A 1/1980 Scales
4,483,030 A 11/1984 Flick et al.
4,660,388 A 4/1987 Greene, Jr.
4,825,488 A 5/1989 Bedford
4,853,992 A 8/1989 Yu
4,997,230 A 3/1991 Spitalnick
5,007,123 A 4/1991 Salyards
5,035,014 A 7/1991 Blanchard
5,249,319 A 10/1993 Higgs
5,416,935 A 5/1995 Nieh
5,473,783 A 12/1995 Allen
5,498,278 A 3/1996 Edlund et al.
5,611,096 A 3/1997 Bartlett et al.
5,640,728 A 6/1997 Graebe
5,647,079 A 7/1997 Hakamiun et al.
5,681,368 A 10/1997 Rahimzadeh
5,701,621 A 12/1997 Landi et al.
5,755,000 A 5/1998 Thompson et al.
5,882,349 A 3/1999 Wilkerson et al.
5,887,304 A 3/1999 von der Heyde et al.
5,921,858 A 7/1999 Kawai et al.
5,926,884 A 7/1999 Biggie et al.
5,989,285 A * 11/1999 DeVilbiss ............ A47C 21/048 607/104
6,065,166 A 5/2000 Sharrock et al.
6,085,369 A 7/2000 Feher et al.
6,182,315 B1 2/2001 Lee
6,272,707 B1 8/2001 Robrecht et al.
6,288,076 B1 9/2001 Kostyniak et al.
6,336,237 B1 1/2002 Schmid
6,341,395 B1 1/2002 Chao
6,353,950 B1 3/2002 Bartlett et al.
6,363,551 B1 4/2002 Flores
6,418,579 B2 7/2002 Perez et al.
6,421,859 B1 7/2002 Hicks et al.
6,487,739 B1 12/2002 Harker
6,493,889 B2 12/2002 Kocurek
6,527,832 B2 3/2003 Oku et al.
6,546,576 B1 4/2003 Lin
6,671,911 B1 1/2004 Hill et al.
6,687,937 B2 2/2004 Harker
6,709,492 B1 3/2004 Spadaccini et al.
6,779,592 B1 8/2004 Ichigaya
6,782,574 B2 8/2004 Totton et al.
6,868,569 B2 3/2005 VanSteenburg
6,904,629 B2 6/2005 Wu
7,036,163 B2 5/2006 Schmid
7,140,495 B2 11/2006 Hester et al.
7,165,281 B2 1/2007 Larssson et al.
7,191,482 B2 3/2007 Romano et al.
7,240,386 B1 7/2007 McKay et al.
7,290,300 B1 11/2007 Khambete
7,296,315 B2 11/2007 Totton et al.
7,334,280 B1 2/2008 Swartzburg
7,357,830 B2 4/2008 Weidmann
7,480,953 B2 1/2009 Romano et al.
7,631,377 B1 12/2009 Sanford
7,637,573 B2 12/2009 Bajic et al.
7,712,164 B2 5/2010 Chambers
7,886,385 B2 2/2011 Carlitz
7,913,332 B1 3/2011 Barnhart
7,914,611 B2 3/2011 Vrzalik et al.
7,937,789 B2 5/2011 Feher
7,937,791 B2 5/2011 Meyer et al.
7,966,680 B2 6/2011 Romano et al.
8,043,238 B1 * 10/2011 Tamura .............. A61G 7/05769 601/150
8,118,920 B2 2/2012 Vrzalik et al.
8,181,290 B2 5/2012 Brykalski et al.
8,353,069 B1 * 1/2013 Miller .................. A47C 21/044 5/724
8,372,182 B2 2/2013 Vrzalik et al.
8,490,226 B2 7/2013 Koger et al.
8,539,624 B2 9/2013 Terech et al.
8,601,620 B2 12/2013 Romano et al.
8,640,279 B2 2/2014 Koger et al.
8,739,339 B1 6/2014 McKay et al.
8,856,993 B2 10/2014 Richards et al.
8,918,930 B2 12/2014 Stroh et al.
9,089,462 B1 * 7/2015 Lafleche ............ A61G 7/05715
9,131,780 B2 9/2015 Lachenbruch et al.
9,131,781 B2 9/2015 Zaiss et al.
9,222,685 B2 * 12/2015 Lachenbruch ............ A61F 7/00
9,254,231 B2 2/2016 Vrzalik et al.
9,326,903 B2 5/2016 Locke
2002/0100121 A1 8/2002 Kocurek
2002/0129449 A1 9/2002 Harker
2002/0148047 A1 10/2002 Corzani et al.
2003/0019044 A1 1/2003 Larsson et al.
2003/0145380 A1 8/2003 Schmid
2004/0003471 A1 1/2004 VanSteenburg
2004/0064888 A1 4/2004 Wu
2004/0214495 A1 10/2004 Foss et al.
2004/0237203 A1 12/2004 Romano et al.
2005/0011009 A1 1/2005 Wu
2005/0022308 A1 2/2005 Totton et al.
2005/0086739 A1 4/2005 Wu
2005/0188467 A1 9/2005 Woolfson
2005/0278863 A1 12/2005 Bahash et al.
2006/0010607 A1 1/2006 Schneider
2006/0080778 A1 4/2006 Chambers
2007/0056116 A1 3/2007 Galardo
2007/0234481 A1 10/2007 Totton et al.
2007/0266499 A1 11/2007 O'Keefe et al.
2008/0028536 A1 2/2008 Hadden-Cook
2008/0060131 A1 3/2008 Tompkins
2008/0098529 A1 5/2008 Flocard et al.
2008/0148481 A1 6/2008 Brykalski et al.
2008/0263776 A1 10/2008 O'Reagan et al.
2009/0000031 A1 1/2009 Feher
2009/0013470 A1 1/2009 Richards et al.
2009/0322124 A1 12/2009 Barkow et al.
2010/0011502 A1 1/2010 Brykalski et al.
2010/0043143 A1 2/2010 O'Reagan et al.
2010/0071127 A1 3/2010 Koger et al.
2010/0095461 A1 4/2010 Romano et al.
2010/0122417 A1 5/2010 Vrzalik et al.
2010/0175196 A1 7/2010 Lafleche et al.
2010/0274331 A1 10/2010 Williamson et al.
2010/0287701 A1 11/2010 Frias
2010/0325796 A1 12/2010 Lachenbruch et al.
2011/0004997 A1 1/2011 Hale et al.
2011/0010850 A1 1/2011 Frias
2011/0010855 A1 1/2011 Flessate
2011/0035880 A1 2/2011 Cole et al.
2011/0041246 A1 2/2011 Li et al.
2011/0068939 A1 3/2011 Lachenbruch
2011/0107514 A1 5/2011 Brykalski et al.
2011/0109128 A1 5/2011 Axakov et al.
2011/0247143 A1 10/2011 Richards et al.
2011/0289685 A1 12/2011 Romano et al.
2012/0144584 A1 6/2012 Vrzalik et al.
2012/0227182 A1 * 9/2012 Brykalski ........... A47C 21/044 5/423
2013/0074272 A1 3/2013 Lachenbruch et al.
2013/0117936 A1 5/2013 Stryker et al.

(56) References Cited

U.S. PATENT DOCUMENTS

| | | | | |
|---|---|---|---|---|
| 2013/0298330 | A1* | 11/2013 | Lachenbruch ......... | A61G 7/057<br>5/606 |
| 2014/0047646 | A1 | 2/2014 | Lachenbruch et al. | |
| 2014/0109314 | A1 | 4/2014 | Boersma et al. | |
| 2014/0201909 | A1 | 7/2014 | Weyl | |
| 2014/0283308 | A1 | 9/2014 | Chen et al. | |

FOREIGN PATENT DOCUMENTS

| | | | |
|---|---|---|---|
| EP | 1645258 | A1 | 4/2006 |
| EP | 1687139 | A1 | 8/2006 |
| EP | 1863369 | A2 | 12/2007 |
| EP | 1901636 | A1 | 3/2008 |
| EP | 1971246 | A2 | 9/2008 |
| EP | 1919328 | B1 | 3/2009 |
| EP | 2047770 | A1 | 4/2009 |
| EP | 2258242 | A1 | 12/2010 |
| EP | 2319474 | A1 | 5/2011 |
| WO | 2004082551 | A1 | 9/2004 |
| WO | 2013156438 | A1 | 10/2013 |

* cited by examiner

TOPPER WITH TARGETED FLUID FLOW DISTRIBUTION

CROSS-REFERENCE TO RELATED APPLICATIONS

This application is a continuation of U.S. application Ser. No. 16/863,037, filed Apr. 30, 2020, which is a continuation of U.S. application Ser. No. 14/969,284, filed Dec. 15, 2015, which is a continuation of U.S. application Ser. No. 13/401,401, filed Feb. 21, 2012, which is incorporated by reference herein in its entirety.

TECHNICAL FIELD

The subject matter described herein relates to mattress toppers of the kind used in connection with beds, in particular a microclimate control topper having features for preferentially distributing fluid flowing through the topper to locations where fluid flow is expected to be of most benefit to an occupant of the bed.

BACKGROUND

Microclimate control toppers are typically used in conjunction with the mattresses of beds found in hospitals, nursing homes, other health care facilities, or in home care settings. The topper rests atop the mattress and is secured thereto by, for example, straps, snaps or zippers, or may be more permanently integrated into the mattress, for example by stitching or welds appropriate to the materials from which the mattress and topper are made. A fluid flowpath having an inlet and an outlet extends through the interior of the topper. A pump or similar device supplies a stream of air to the topper so that the air flows into the flowpath by way of the inlet, flows through the flowpath, and exhausts from the flowpath by way of the outlet. The airstream establishes a microclimate in the vicinity of the occupant's skin. Specifically, the airstream helps cool the occupant's skin thereby reducing its nutrient requirements at a time when it is compressed by the occupant's weight and therefore likely to be poorly perfused. The airstream also helps reduce humidity in the vicinity of the occupant's skin thus combatting the tendency of the skin to become moist and soft and therefore susceptible to breakdown.

The need for microclimate control is not uniformly distributed over the occupant's skin. For example skin temperature on the occupant's torso can be considerably higher than skin temperature on the occupant's arms and legs. In addition, nonuniform distribution of sweat glands causes perspiration to accumulate on the skin of the occupant's back and pelvic region. Moreover, many modern beds are profile adjustable. When the bed profile is adjusted the occupant's tissue is exposed to shear which distorts the vasculature and further degrades perfusion.

SUMMARY

The present application discloses a topper for a bed. The topper extends in longitudinal and lateral directions and includes a fluid flowpath for channeling fluid through the topper from an inlet to an outlet. The flowpath is configured to distribute the fluid to a preferred target region of the topper. The application also discloses a bed which includes the topper and a blower connected to the topper inlet for supplying air to the flowpath.

BRIEF DESCRIPTION OF THE DRAWINGS

The foregoing and other features of the variants of the topper described herein will become more apparent from the following detailed description and the accompanying drawings in which.

DETAILED DESCRIPTION OF THE DRAWINGS

Figure 1:
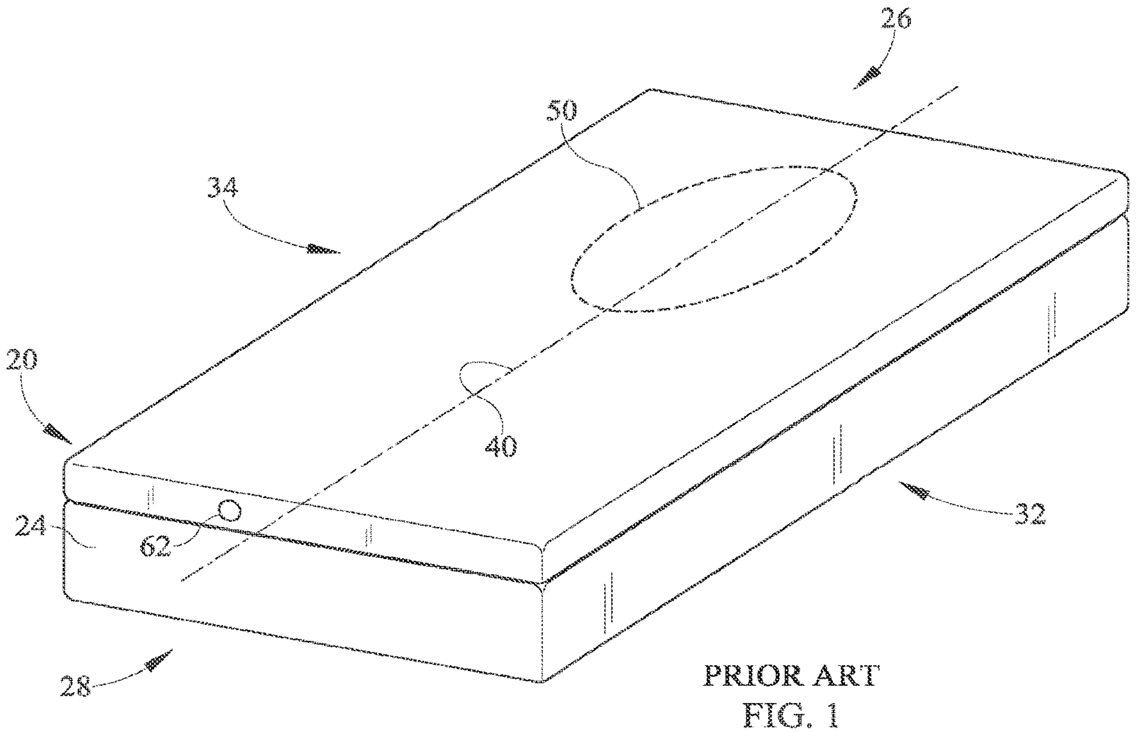
PRIOR ART FIG. 1
FIGS. 1-4 are simplified perspective, plan, side elevation and end elevation views of a mattress and a conventional topper having a fluid flowpath extending therethrough.
Figure 3:
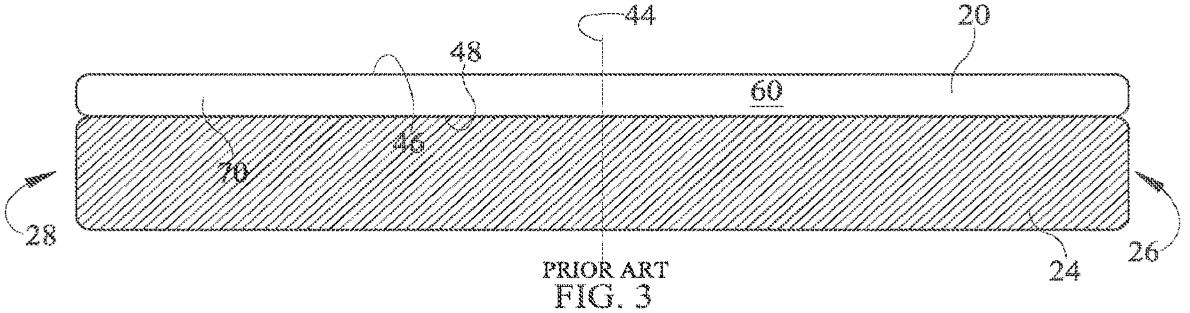
PRIOR ART FIG. 3
Figure 4:
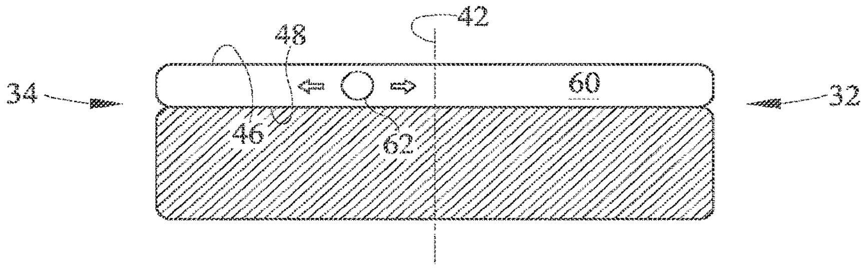
PRIOR ART FIG. 4
Figure 2:
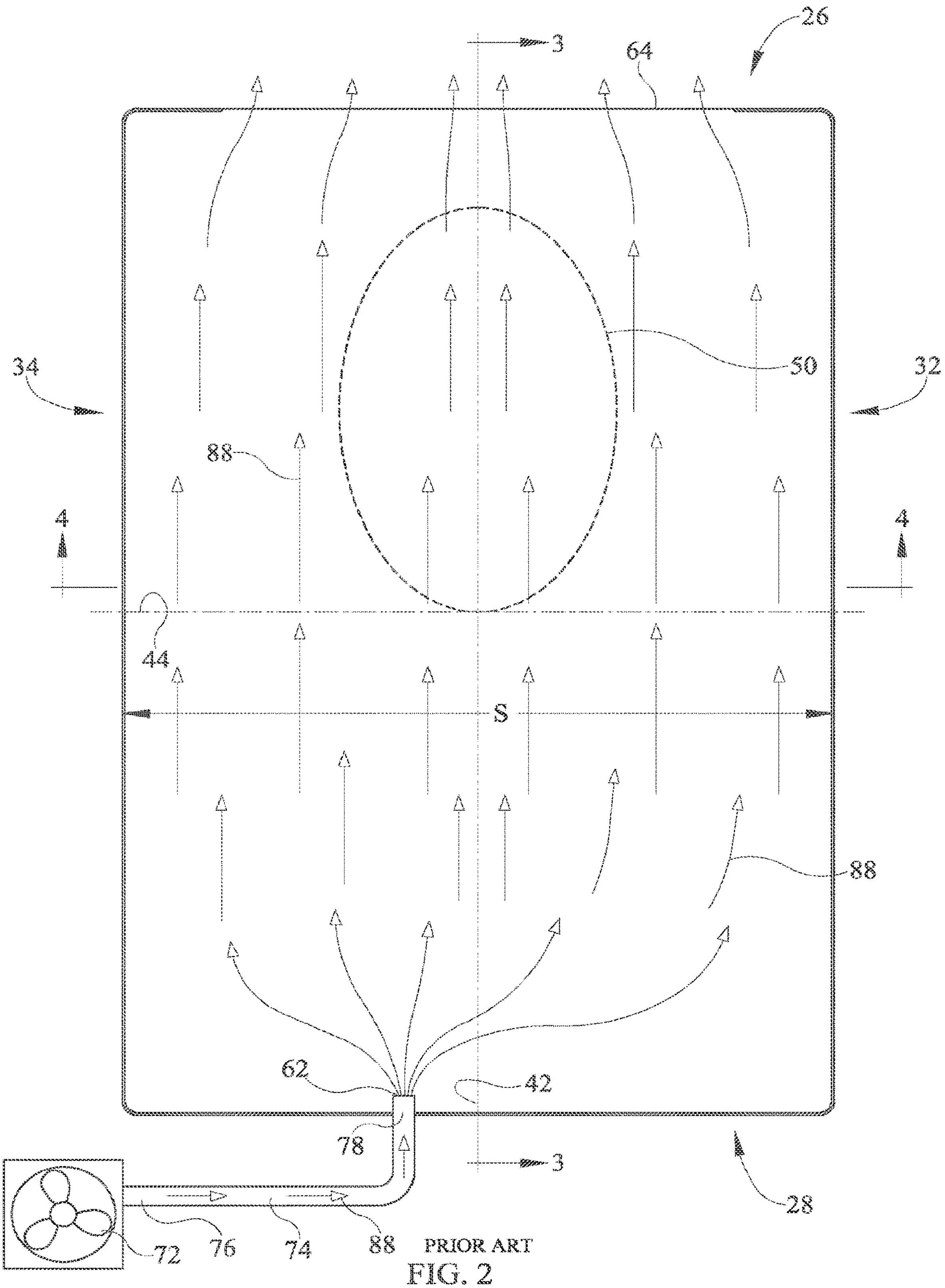

FIGS. 1-4 show a conventional topper 20 resting atop a mattress 24. The topper extends longitudinally from a head end 26 to a foot end 28 and spans laterally from a left side 32 to a right side 34. A longitudinally extending centerline 40 and centerplane 42 and a spanwise centerplane 44 are shown for reference. The topper has an upper or occupant side surface 46 and a lower or mattress side surface 48. A target region 50 on upper surface 46 is a region corresponding to a portion of an occupant's body judged to be especially needful of local climate control. The illustrated target region corresponds approximately to the torso of a representative patient lying face up (supine) and centered on the topper. A fluid flowpath 60 having an inlet 62 and an outlet 64 spans laterally across the topper from its left side 32 to its right side 34 and extends longitudinally through the topper. A blower 72 or similar device is connected to the inlet by a hose 74 having a blower end 76 and a topper end 78 so that the blower can impel a stream 88 of air to flow through the flowpath. The illustrated topper has no provisions for preferentially directing airstream 88 or any portion thereof to the target region. In particular, the airstream can spread out laterally across the entire span S of the topper through the entire longitudinal length of the topper.

Figure 5:
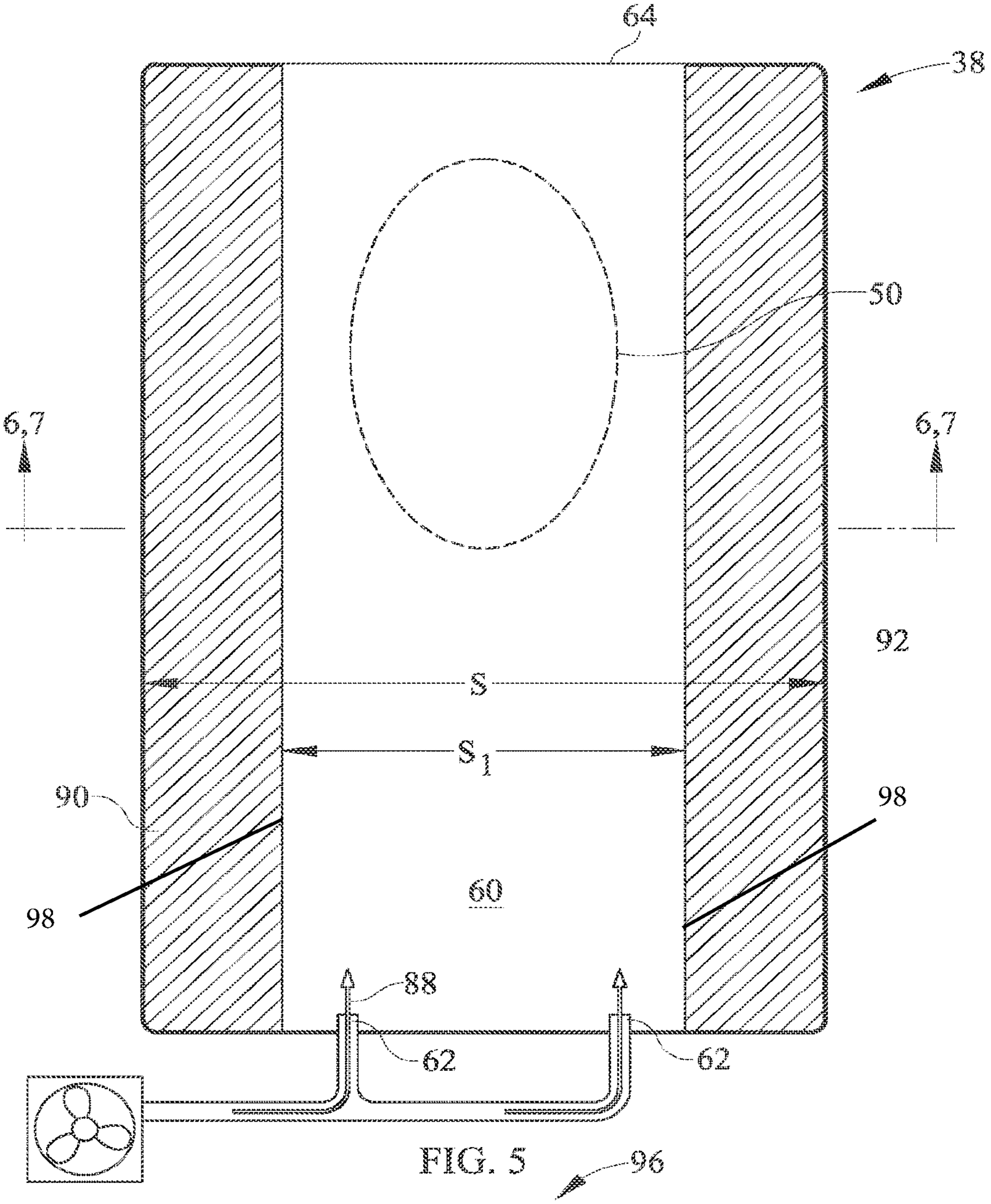
FIG. 5 is a plan view of a topper having linear margins and a laterally symmetric fluid flowpath for distributing fluid flowing through the flowpath to a preferred target region of the topper.

FIG. 5 shows an embodiment of an innovative topper 38 for a bed. As with the previously described topper the improved topper is configured to rest atop a mattress such as mattress 24 of FIGS. 1, 3 and 4. The topper extends in longitudinal and lateral directions and includes a fluid flowpath 60 for channeling a stream of air 88 through the topper from an inlet 62 to an outlet 64. In the illustrated topper inlet 62 is a pair of inlet ports at the foot end of the topper and outlet 64 is a wide vent opening at the head end of the topper. Other inlet and outlet designs may be used. Unlike the topper of FIGS. 1-4, the topper of FIG. 5 is configured to distribute air flowing through the flowpath to a preferred target region 50 of the topper, specifically a region 50 corresponding approximately to the torso of a supine person substantially laterally centered on the topper, although other target regions can be defined, if desired. In particular, the topper includes left and right margins 90, 92 linearly bordering flowpath 60. As a result airstream 88 cannot spread across the entire span S of the topper but instead is confined to span 51 through the entire longitudinal length of the topper. As a result the airstream is more concentrated under the target region than is the case with the conventional topper of FIGS. 1-4.

Figure 6:
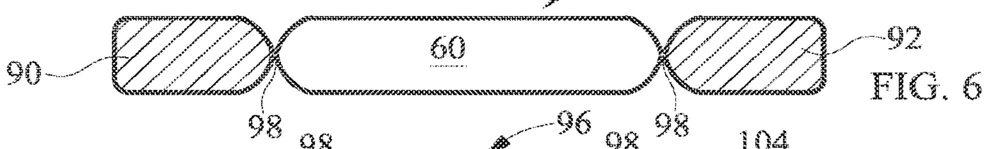
FIG. 6 is a cross section taken along section line 6-6 of FIG. 5 showing a first alternative construction of the topper.

FIG. 6 is a cross section in the direction 6-6 of FIG. 5 showing a first alternative construction of the topper. The topper comprises a central region 96 corresponding to flowpath 60 and the margins 90, 92 each joined to the central region at a seam 98. Example margins include foam or an inflated static bladder, i.e. a bladder through which air does not flow. The nature of seam 98 depends on the materials used to make the central region and margins.

Figure 7A:
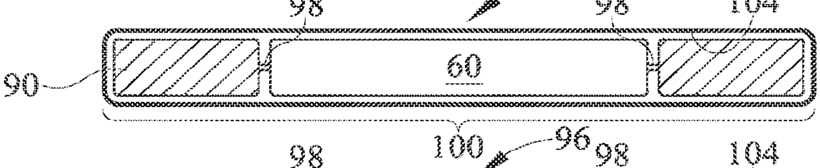
FIGS. 7A and 7B are cross sections taken along section line 7-7 of FIG. 5 showing a second alternative construction of the topper.
Figure 7B:
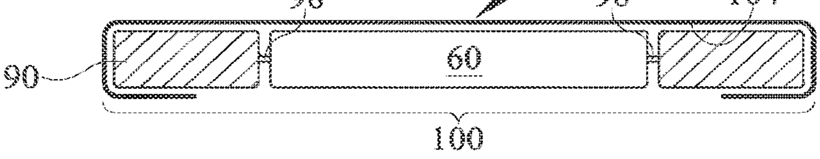

FIGS. 7A and 7B are cross sections in the direction 7-7 of FIG. 5 showing two variants of a second alternative construction of the topper. In the second alternative, central region 96, which corresponds to flowpath 60, and margins 90, 92 comprise an insert 100 enclosed by a ticking 104 (FIG. 7A) or covered by a ticking 104 (FIG. 7B). The central region and margins are attached to each other at a seam 98 or other suitable connection.

Figure 8:
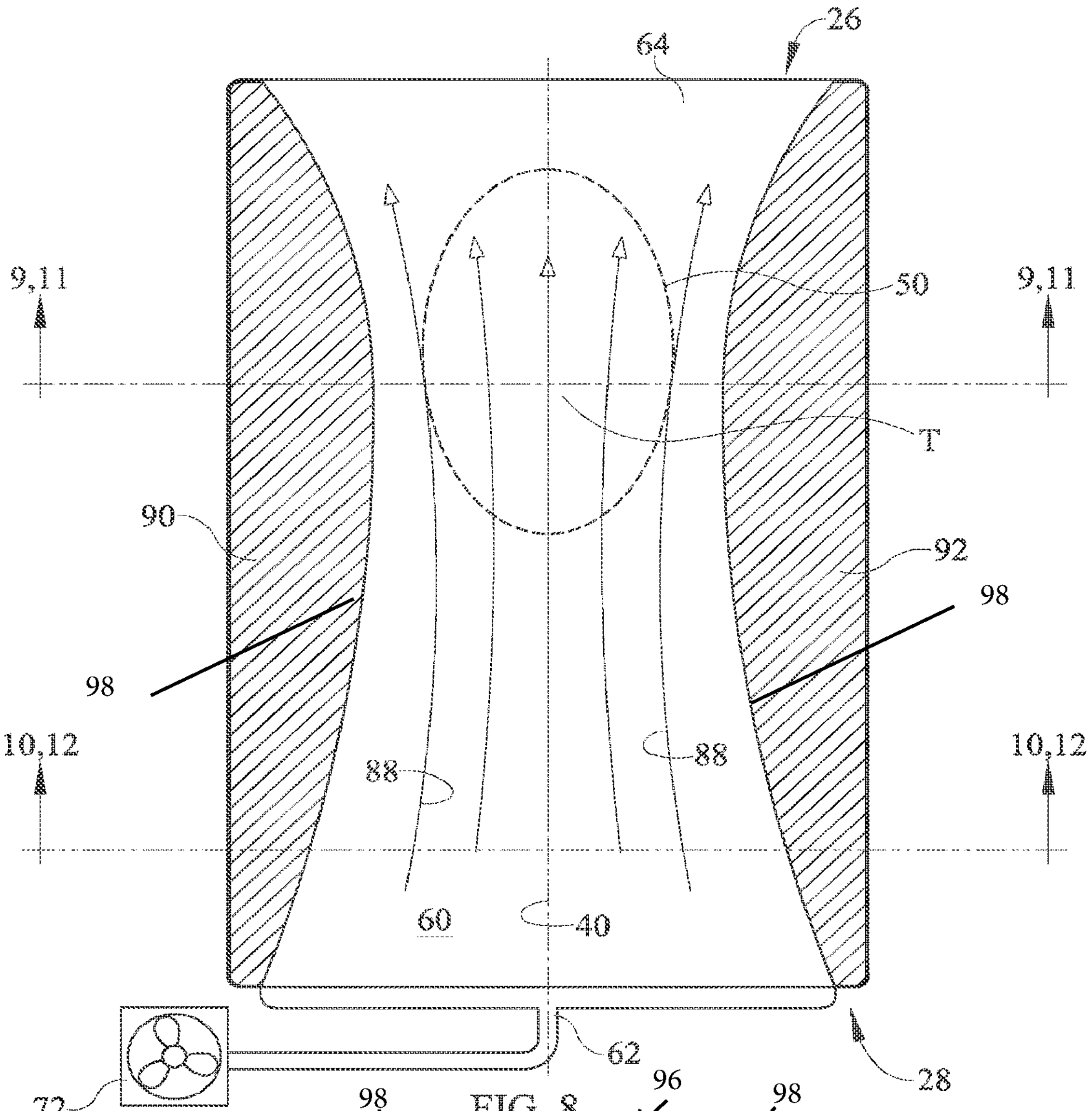
FIG. 8 is a plan view of a topper having contoured margins and a laterally symmetric fluid flowpath for distributing fluid flowing through the flowpath to a preferred target region of the topper and also showing a pattern of fluid flow through the topper.

FIG. 8 shows another topper configured to distribute air flowing through the flowpath to preferred target region 50 of the topper. In particular, the topper includes left and right arcuate margins 90, 92 bordering flowpath 60. The margins converge toward each other with increasing distance from the head and foot ends 26, 28 of the topper to define a throat T (coincident with section lines 9-9 and 11-11). As a result of the flowpath shape arising from the curved borders, airstream 88 is more concentrated under the target region than is the case with the conventional topper of FIGS. 1-4.

Figure 9:
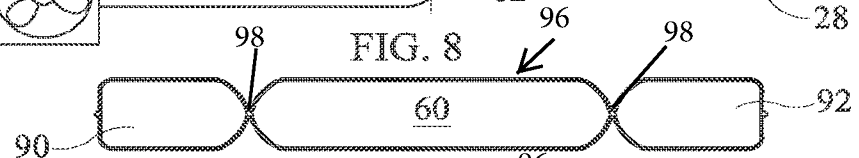
FIGS. 9-10 are cross sections taken along section lines 9-9 and 10-10 of FIG. 8 showing a first alternative construction of the topper.
Figure 10:
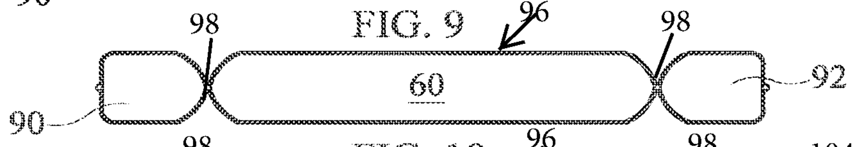
Figure 11:
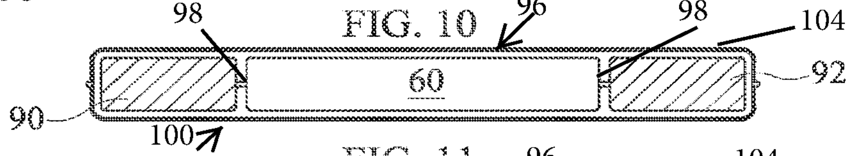
FIGS. 11-12 are cross sections taken along section lines 11-11 and 12-12 of FIG. 8 showing a second alternative construction of the topper.
Figure 12:
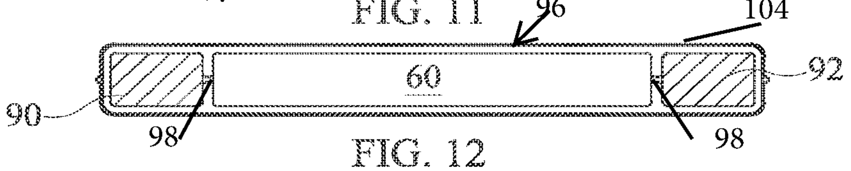

FIGS. 9 and 10 are cross sections taken along section lines 9-9 and 10-10 of FIG. 8 and correspond to the first alternative construction shown in FIG. 6. FIGS. 11 and 12 are cross sections taken along section lines 11-11 and 12-12 of FIG. 8 and correspond to the second alternative construction shown in FIG. 7A.

Figure 13:
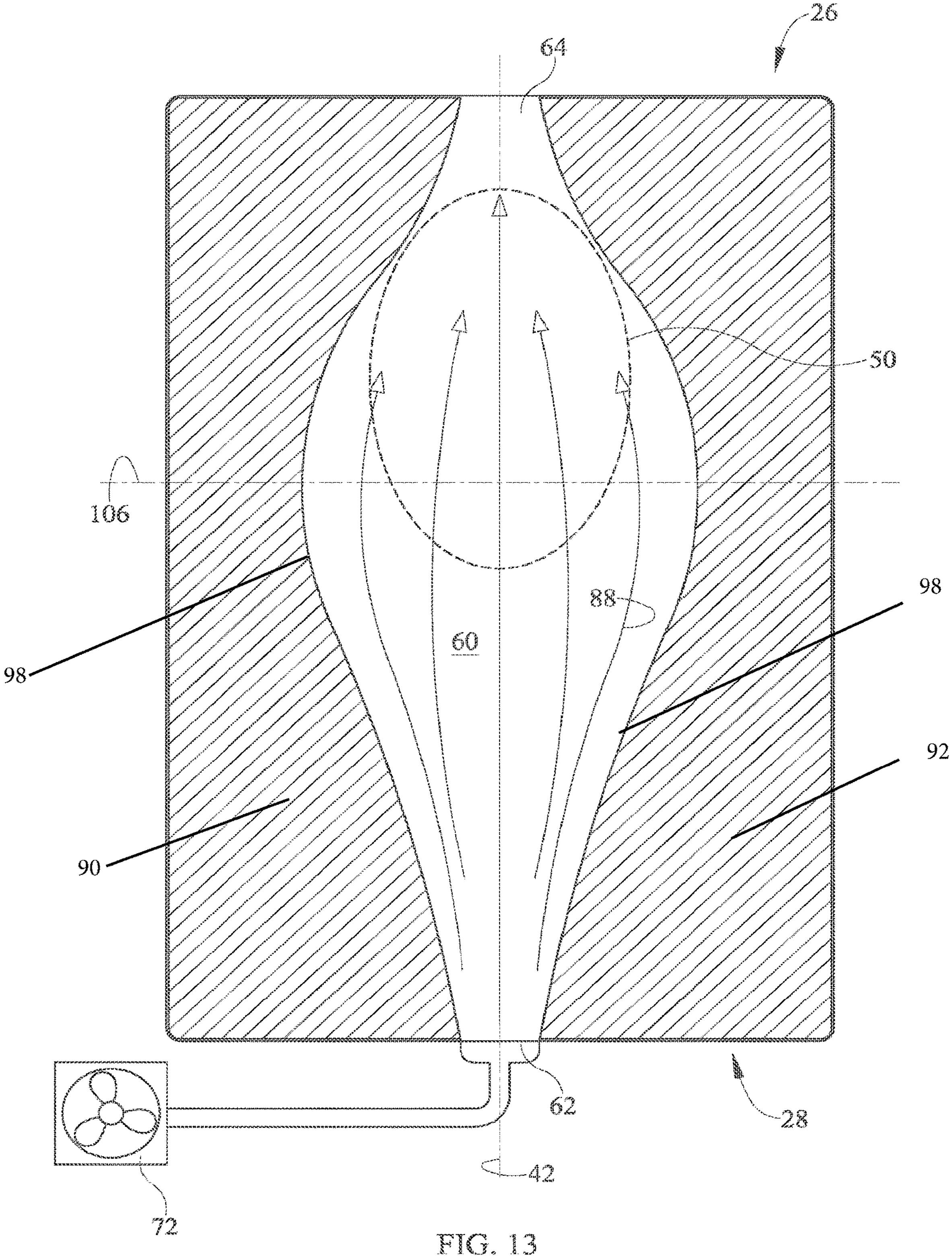
FIGS. 13-15 are plan views similar to that of FIG. 8 showing other variants of contoured margins and laterally symmetric fluid flowpaths.

FIG. 13 shows an embodiment in which the margins diverge away from each other with increasing distance from the head and foot ends 26, 28 of the topper. The resulting flowpath allows airstream to diffuse laterally as it moves from inlet 62 toward plane 106 of maximum flowpath cross section and then to accelerate as it flows from plane 106 to outlet 64.

Figure 14:
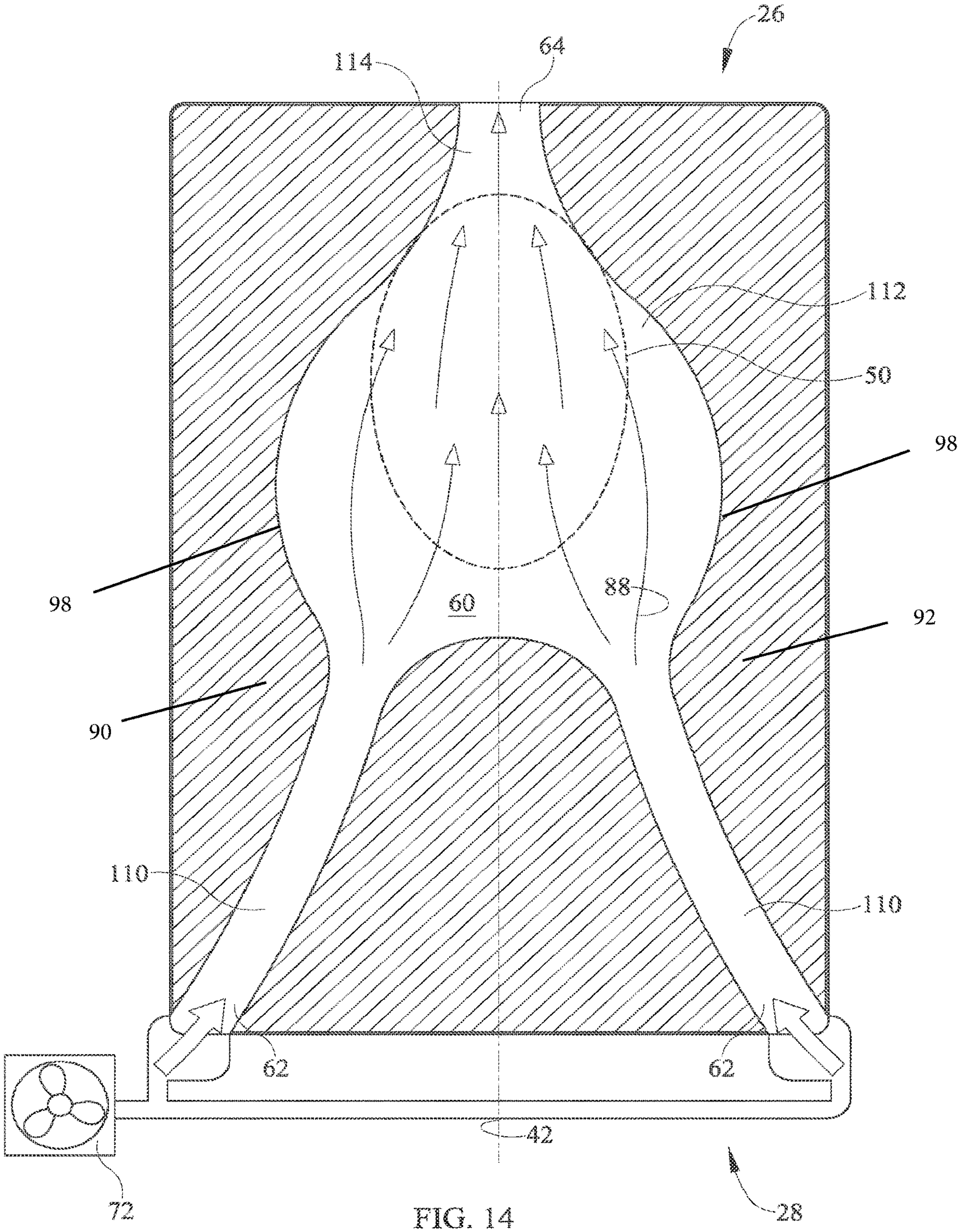

FIG. 14 shows an embodiment having a dual inlets 62 and dual intake conduits 110 for channeling airstream 88 to a working region 112 of the flowpath, and a single outlet 64 and a single discharge conduit 114 for exhausting the airstream from the working region. The working region corresponds approximately to the target region which may correspond to the torso of a supine person substantially laterally centered on the topper.

Figure 15:
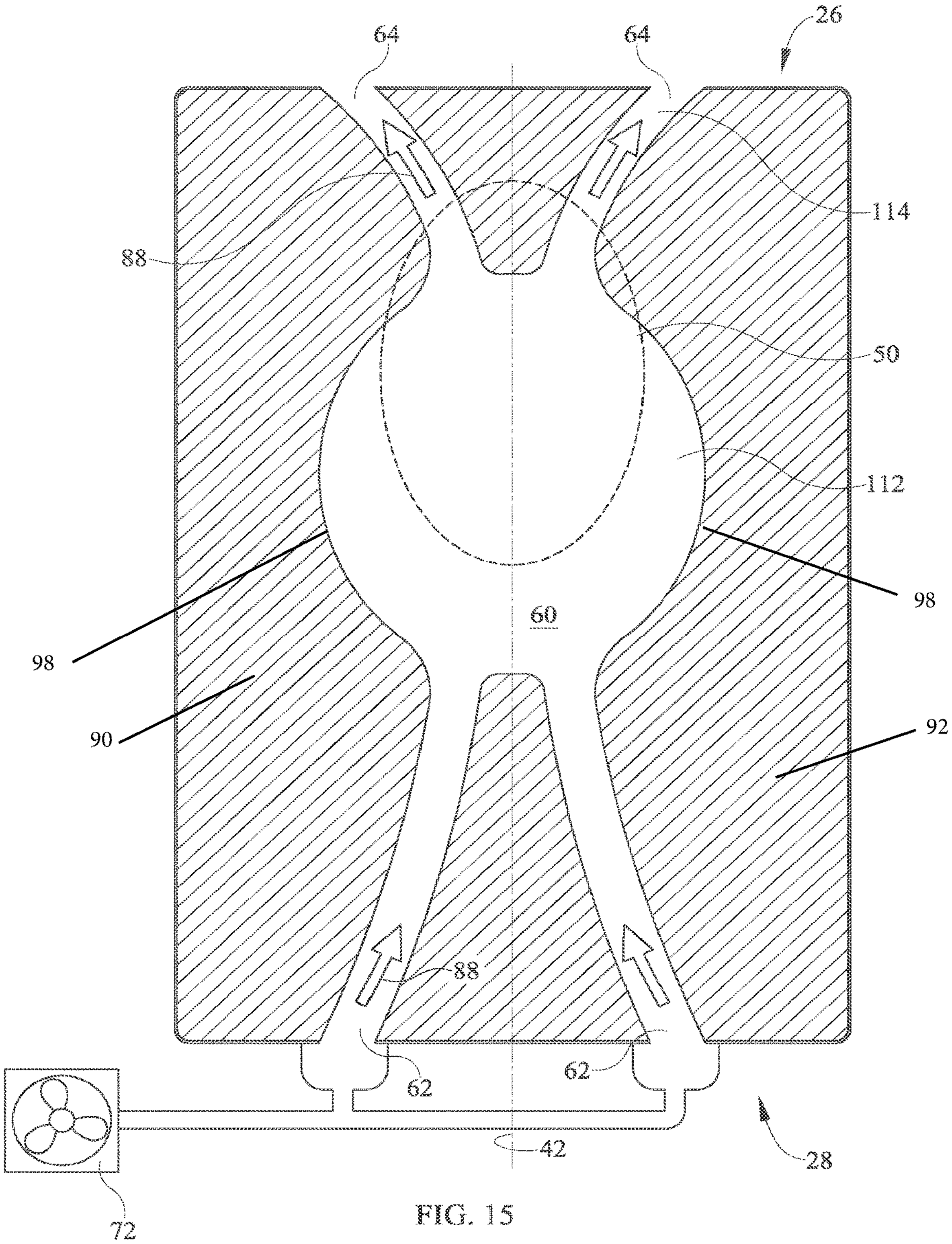

FIG. 15 shows an embodiment similar to that of FIG. 14 but having dual outlets 64 and a pair of discharge conduits 114 for channeling airstream 88 away from working region 112 of the flowpath. The working region corresponds approximately to the target region 50 which may correspond to the torso of a supine person substantially laterally centered on the topper.

Figure 16:
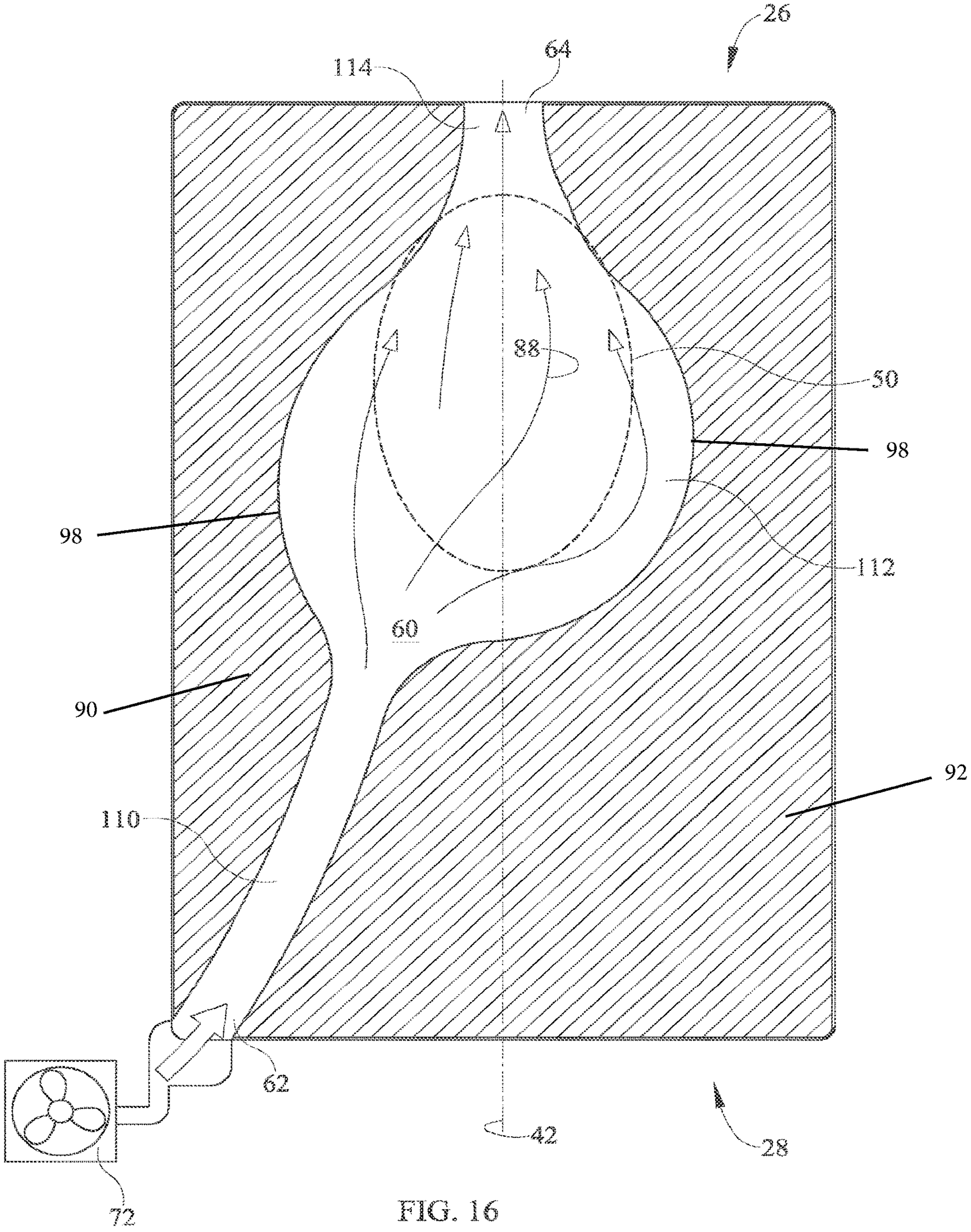
FIG. 16 is a plan view similar to that of FIG. 8 showing another variant of a topper with contoured margins but with a laterally asymmetric fluid flowpath.

FIG. 16 shows an embodiment having a single inlet 62 and a single intake conduit 110 for channeling airstream 88 to working region 112 and a single outlet 64 and a single discharge conduit 114 for exhausting the airstream from the working region. The working region corresponds approximately to the target region which may correspond to the torso of a supine person substantially laterally centered on the topper. Unlike the embodiments of FIGS. 5-15 in which the flowpath is symmetric with respect to centerplane 42, the flowpath of FIG. 16 is asymmetric with respect to centerplane 42.

Figure 17:
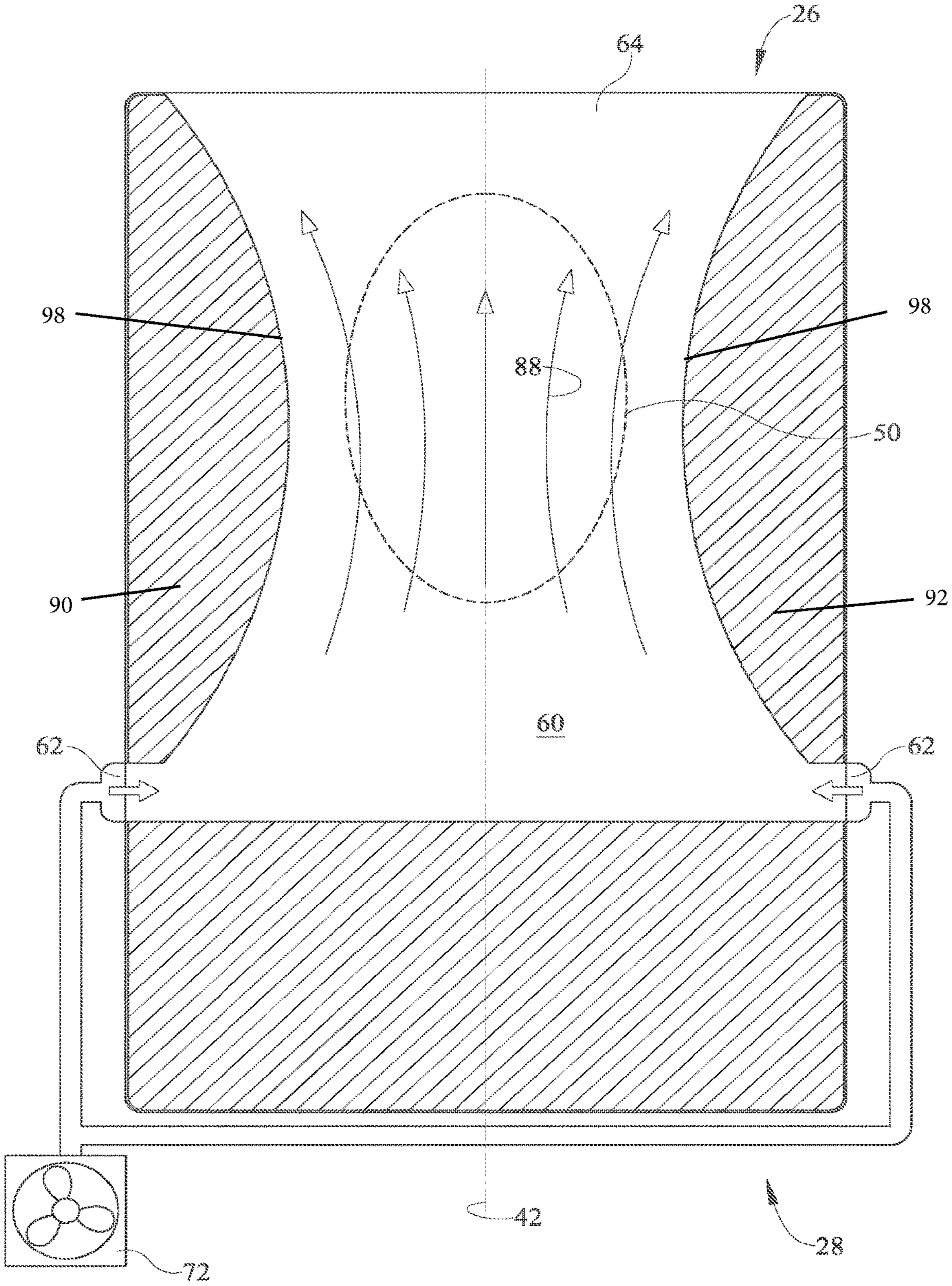
FIGS. 17-19 are plan views similar to that of FIG. 8 each showing a longitudinally foreshortened flowpath.

FIG. 17 shows an embodiment similar to that of FIG. 8 but with dual inlets 62 and a longitudinally foreshortened flowpath 60.

Figure 18:
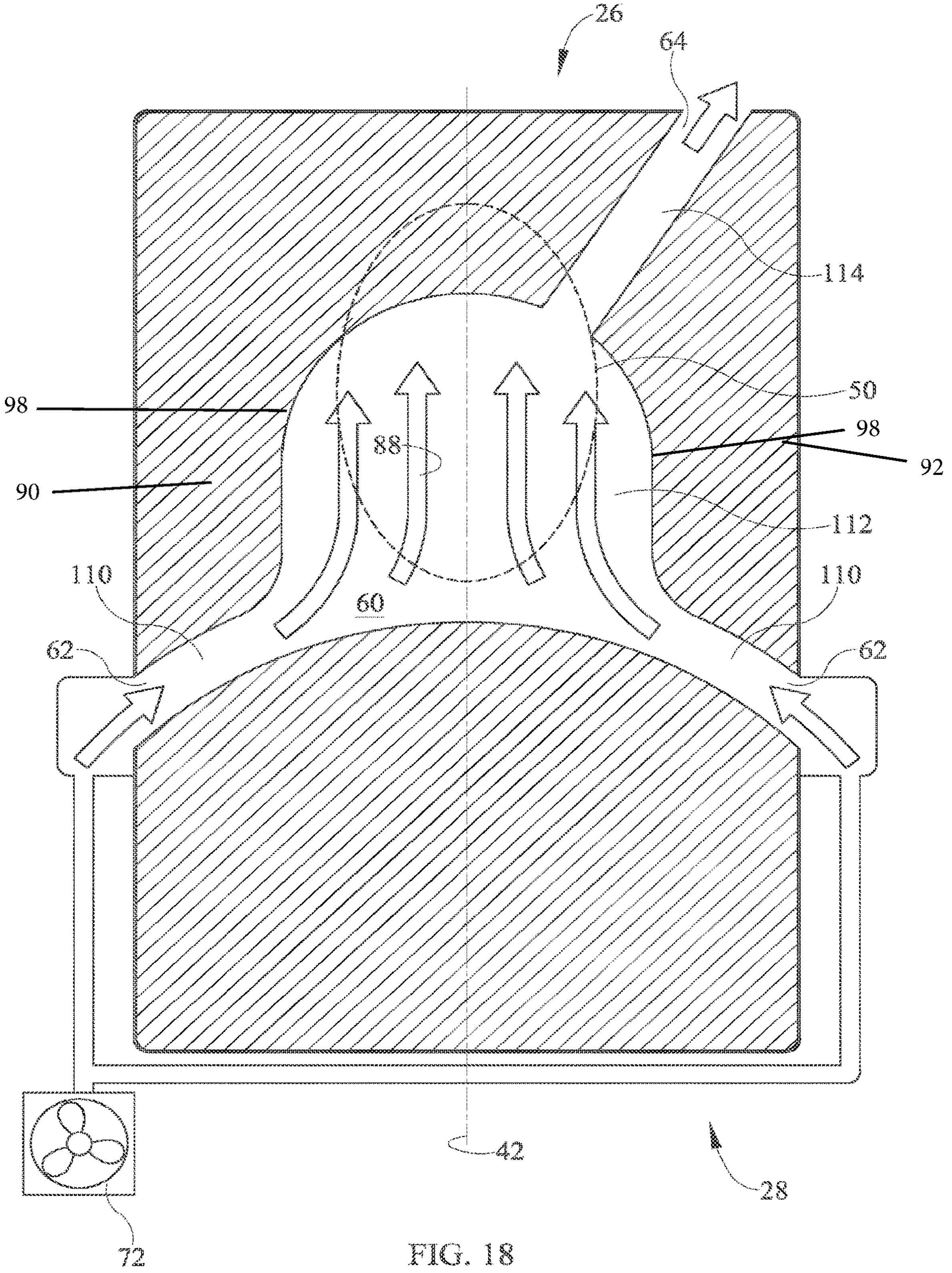

FIG. 18 shows an embodiment similar to that of FIG. 17 but with a working region 112 having an arched planform and a discharge conduit 114 extending obliquely from the target region.

Figure 19:
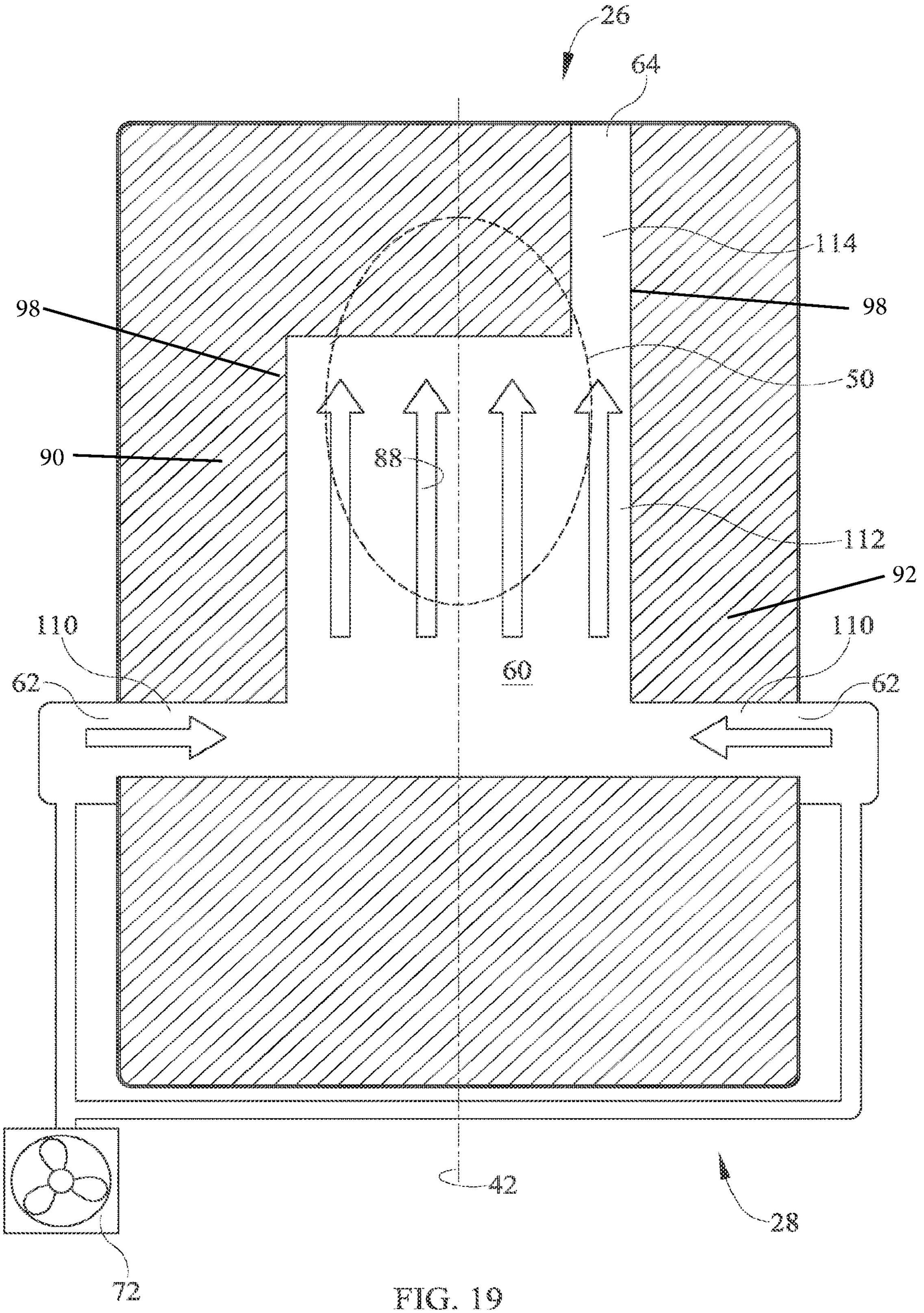

FIG. 19 shows an embodiment similar to that of FIG. 18 but with a working region 112 having a rectangular planform.

Figure 20:
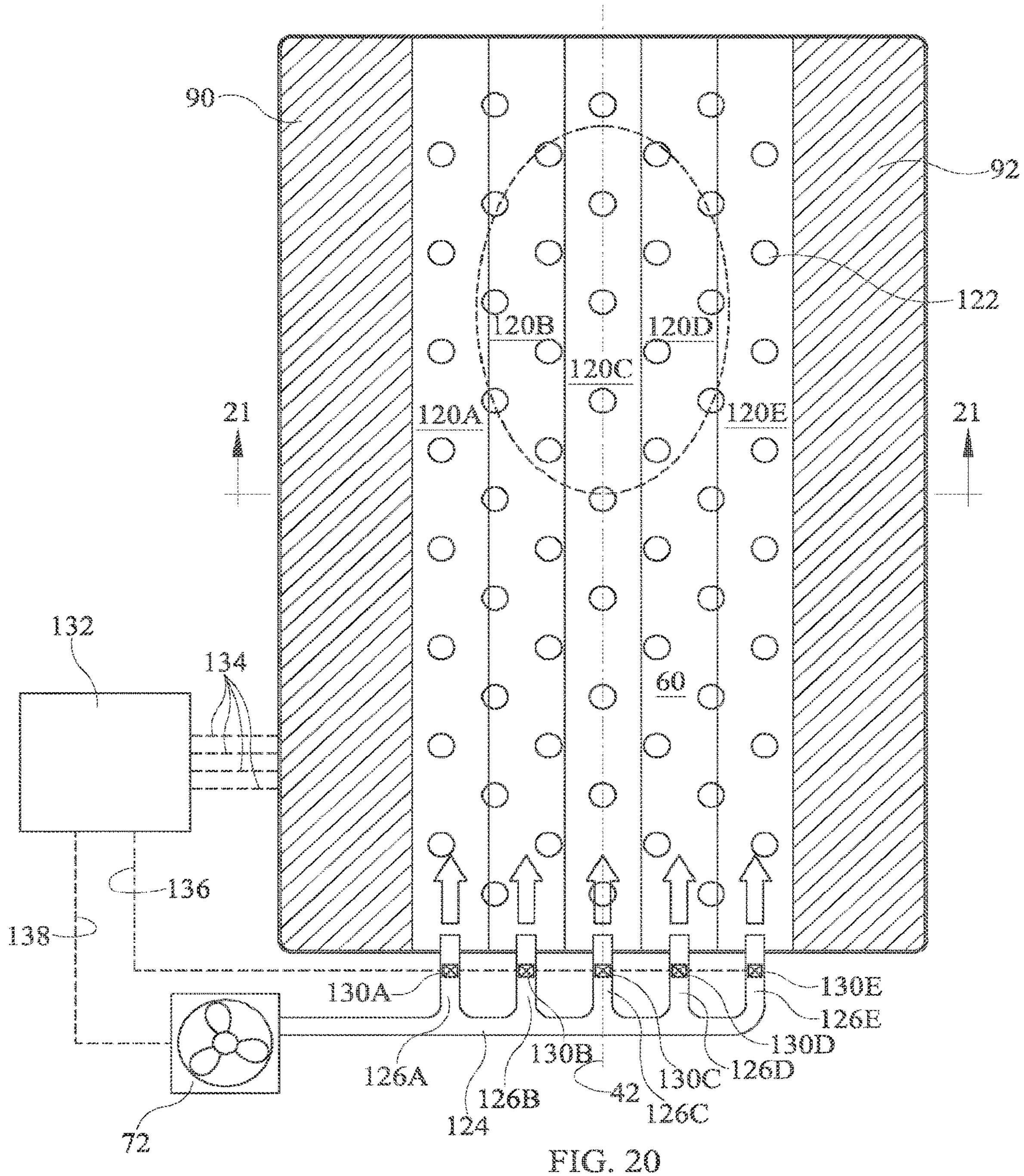
FIG. 20 is a plan view showing a topper with longitudinally extending, coflowing fluid flow passages, an array of sensors capable of sensing a parameter useable for determining weight distribution of a person whose weight bears on the topper, a blower and a controller.
Figure 21:
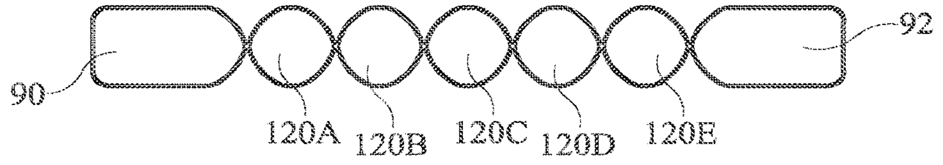
FIG. 21 is a view in the direction 21-21 of FIG. 20.

FIGS. 20 and 21 show a topper in which flowpath 60 is divided into a set of five longitudinally extending, laterally distributed fluid passages 120. The topper also includes an array of sensors 122 capable of sensing a parameter useable for determining weight distribution of a person whose weight bears on the topper. One example is an array of pressure sensors. A blower 72 is in fluid communication with topper flowpath 60 by way of a plumbing network featuring a main feed pipe 124 and a set of branch pipes 126 each outfitted with a valve 130 and each connected to the foot end of one passage. The passages are coflowing passages, i.e. airflow in all the passages is in the same direction—from the foot end toward the head end. A controller 132 is in communication with the sensors, the valves and the blowers as indicated by communication pathways 134, 136 and 138. Although communication pathways 134, 136, 138 suggest a tangible physical connection, other avenues of communication, such as wireless communication, can also be employed.

In operation the controller receives a signal or signals representing a value or values of the sensed parameter or parameters and controls the valves to cause air to be metered to the passages 120 in response to the signal or signals such that a larger proportion of fluid supplied to the flowpath is directed to the target region and a smaller proportion bypasses the target region. For example in the illustrated topper, rather than distributing air from blower 72 equally among the passages, the controller could be programmed to meter only 10% of the air to each of passages 120A, 120E and to distribute the remaining 80% equally or unequally among channels 120B, 120C, 120D. Other distributions could be commanded depending on changes in the location of the target region which result from changes in the position of the occupant as detected by the sensors.

The controller of FIG. 20 is an on-board controller in that it is mounted on the bed itself. Alternatively the controller could be an off-board controller. Off-board controllers include controllers that are components of facility communication and data processing networks.

The foregoing describes topper embodiments in which the flowpath extends predominantly longitudinally through the topper. Alternatively (e.g. FIG. 22) the flowpath can extend predominantly laterally through the topper.

Figure 22:
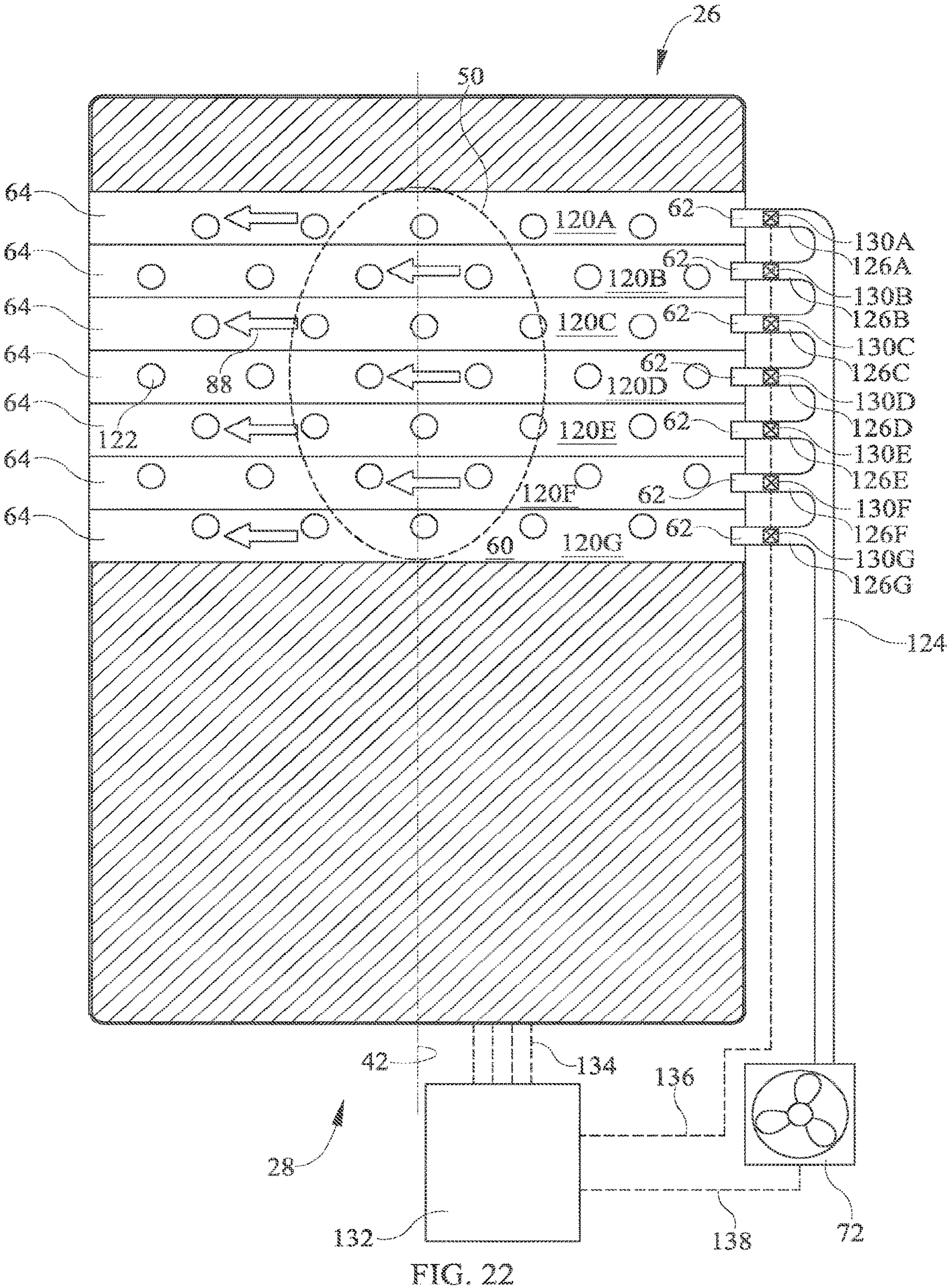
FIGS. 22-25 are plan views similar to that of FIG. 21 showing laterally extending coflowing passages (FIGS. 22, 24) and counterflowing passages (FIGS. 23, 25).

FIG. 22 shows a topper similar to that of FIGS. 20-21 except with laterally extending, longitudinally distributed fluid passages 120. In general the passages are distributed across one of the directions (laterally as in FIG. 20 or longitudinally as in FIG. 22) and extend in the other of the directions (longitudinally as in FIG. 20 or laterally as in FIG. 22).

Figure 23:
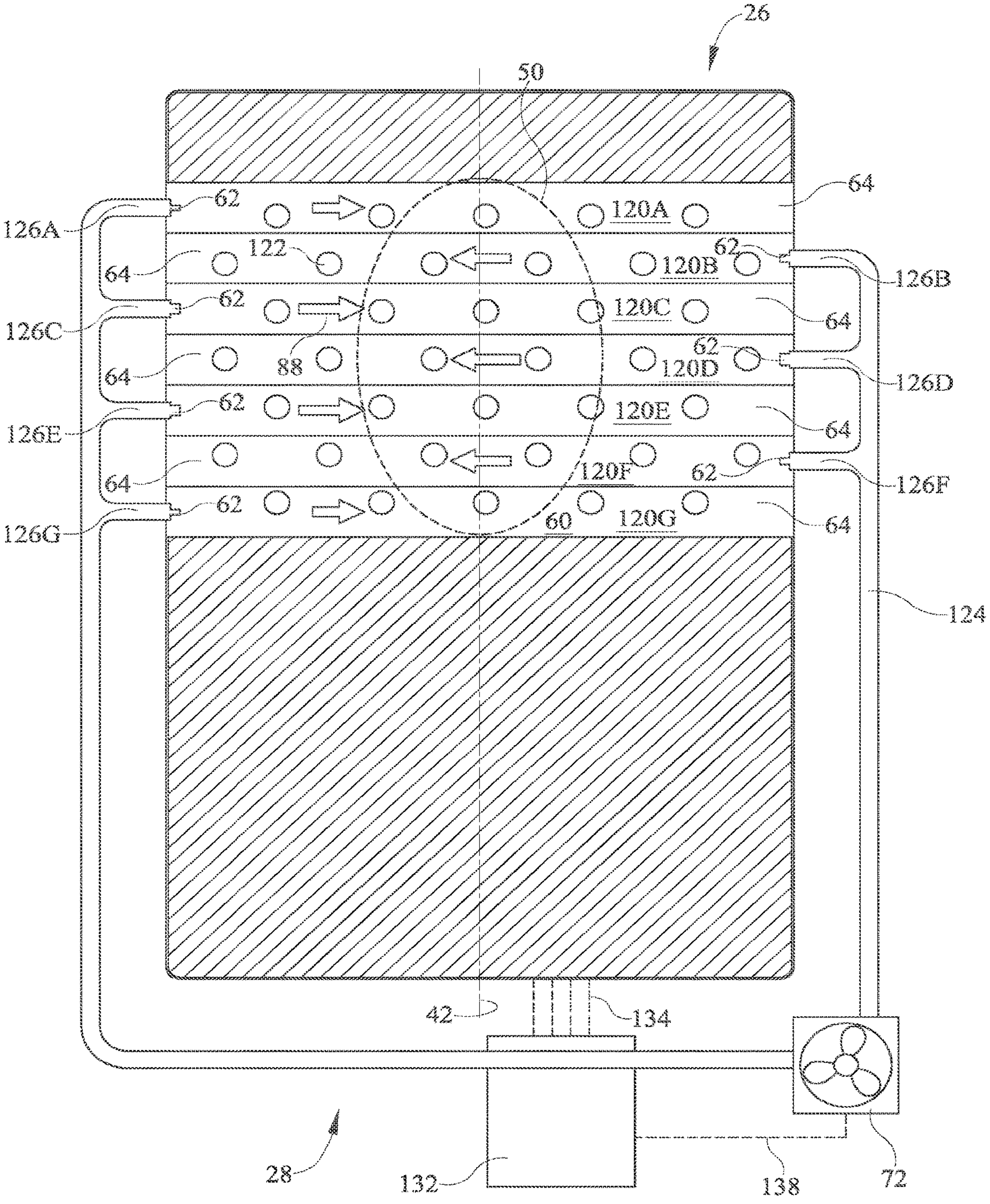

FIGS. 20 and 22 illustrate the use of sensors 122 so that the topper, with the assistance of controller 132 and valves 130, can adapt to changes in the position of the patient. Alternatively, the sensors can be dispensed with, and airflow can be distributed nonuniformly among the passages with appropriately designed, nonadjustable flow restrictions governing airflow through each branch pipe (e.g. as seen in FIG. 23 where the branch pipes feeding passages 120C, 120D and 120E each terminate with a relatively large diameter flow restrictor and the branch pipes feeding the other passages each terminate with a relatively small diameter flow restrictor). However such an arrangement would not be able to automatically adapt to changes in occupant position. In another alternative the flow restrictions may be manually adjustable rather than automatically adjustable. Such an arrangement might be useful to adapt the distribution of airflow to occupant specific target regions, e.g. a smaller target region for a patient of smaller size and a larger target region for a patient of larger size.

FIG. 23 shows a topper similar to that of FIG. 22 but with counterflowing passages, i.e. air flows right to left in passages 120B, 120D, 120F and left to right in the other passages. FIG. 23 also illustrates the use of appropriate flow restriction to regulate airflow distribution among the passages.

Figure 24:
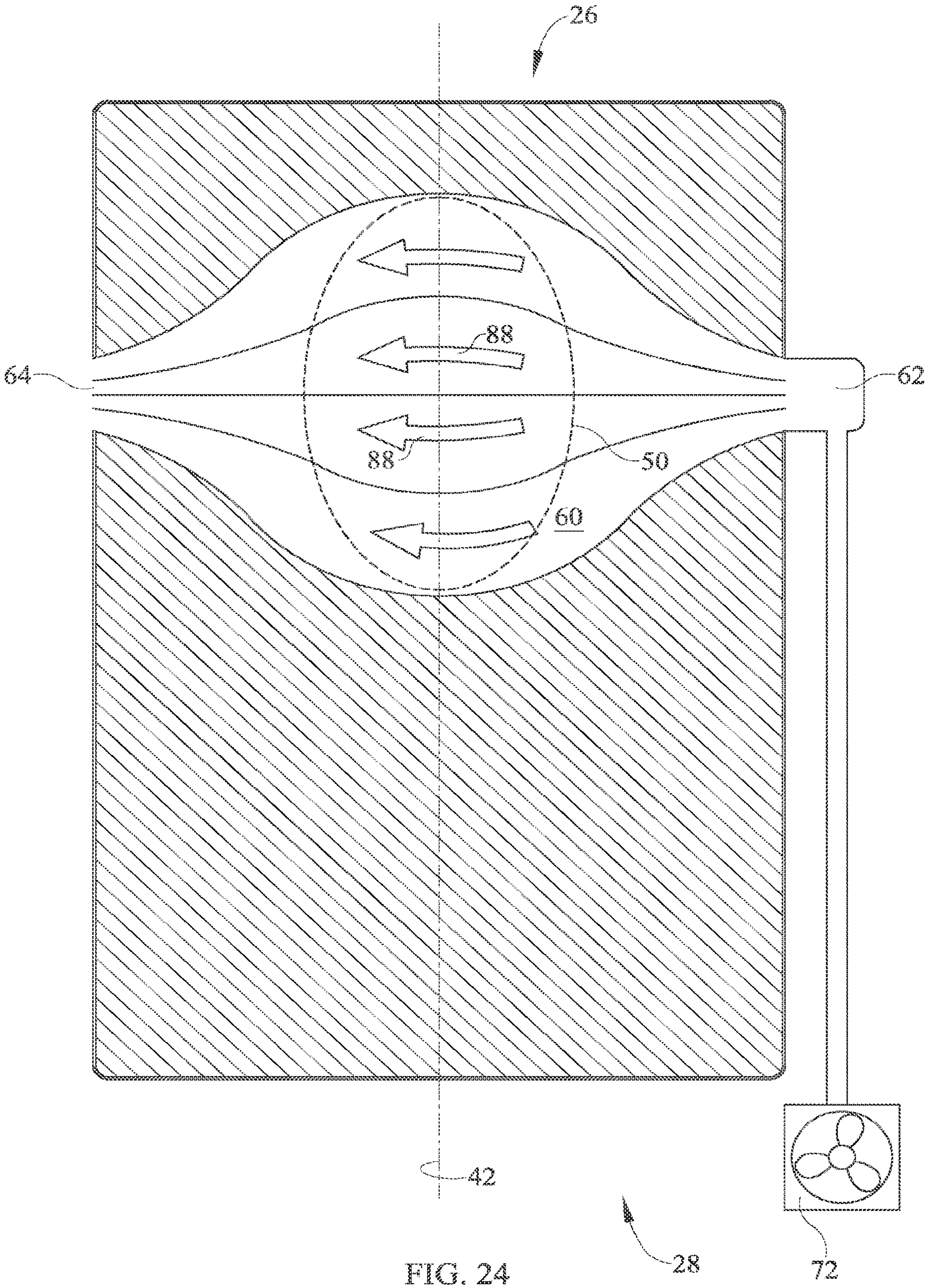

FIG. 24 shows a topper similar to that of FIG. 23 but with a flowpath that increases in longitudinal dimension with increasing lateral distance from the inlets and outlets. The passages are coflowing passages. The illustrated topper does not use sensors, valves or flow restrictions to govern the distribution of airflow through the passages, however such use is within the scope of this disclosure.

Figure 25:
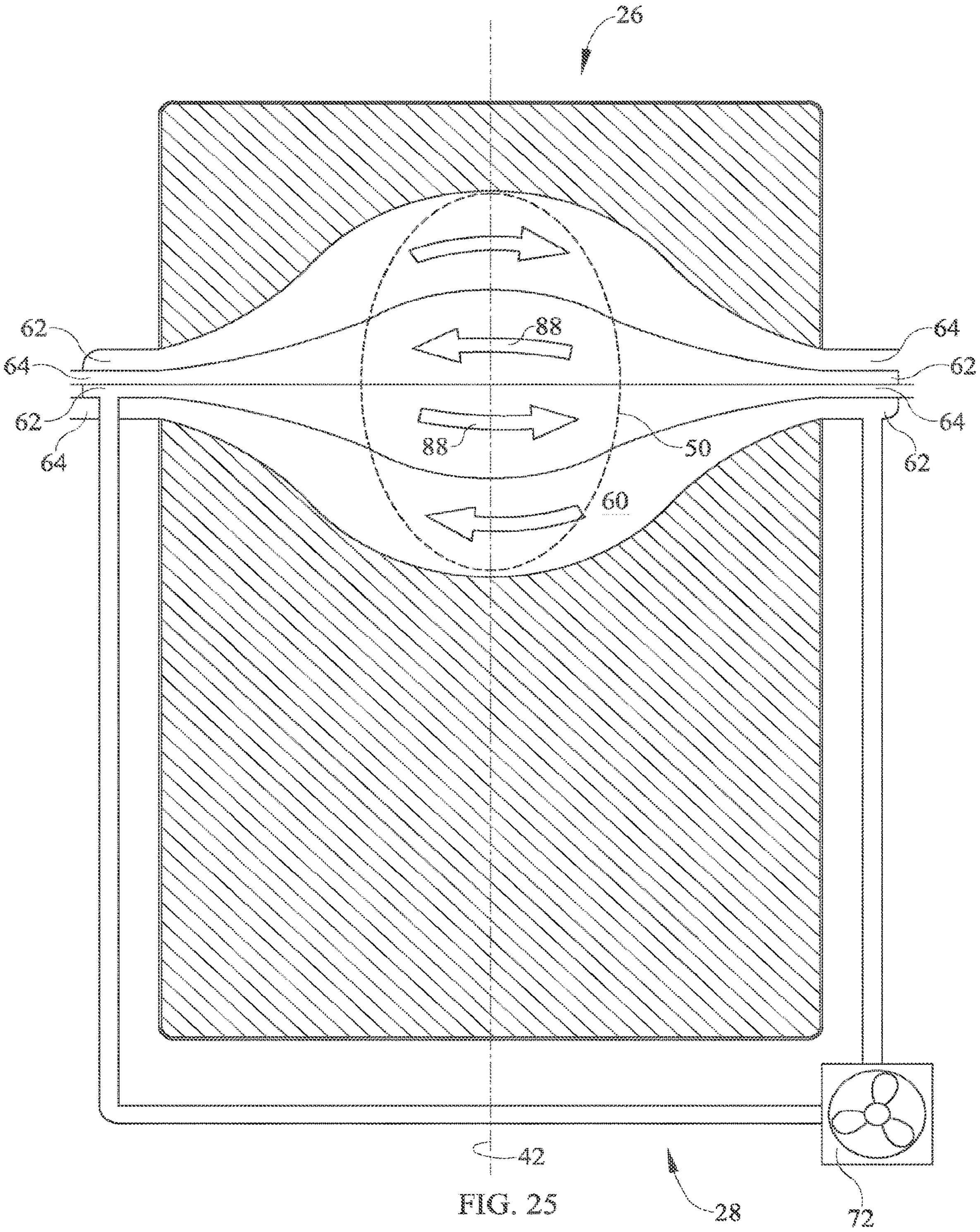

FIG. 25 shows a counterflowing variant of the topper of FIG. 24.

Figure 26:
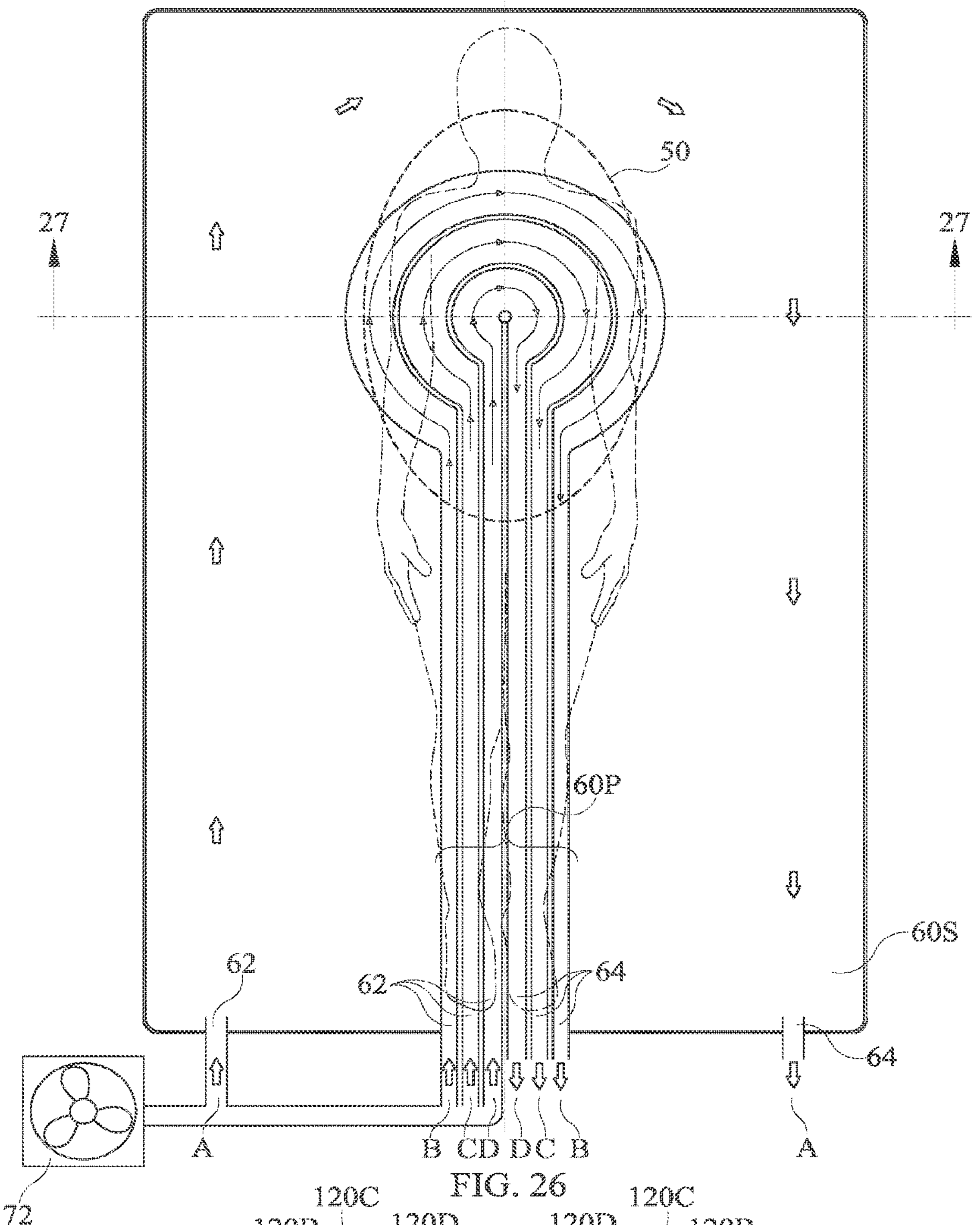
FIGS. 26-27 are a plan view and a cross sectional view of a topper having coflowing nested keyhole passages whose inlets and outlets are at the foot end of the topper.
Figure 27:
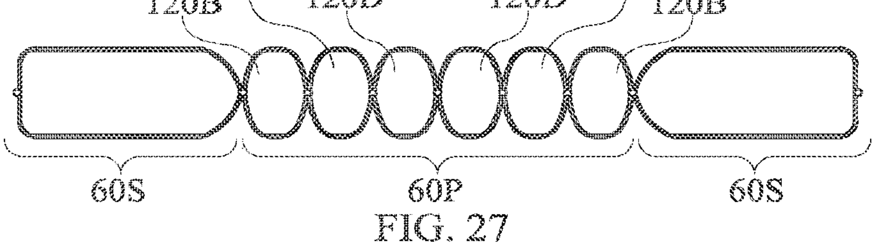

FIGS. 26-27 show a topper in which a principal topper flowpath 60P has a keyhole shape as seen in a plan view. The principle flowpath has three nested, coflowing fluid passages 120B, 120C, 120D. The illustrated topper also has a secondary flowpath 60S comprising passage 120A outboard of the primary flowpath. A nonflowing region could be used in lieu of the secondary flowpath.

Figure 28:
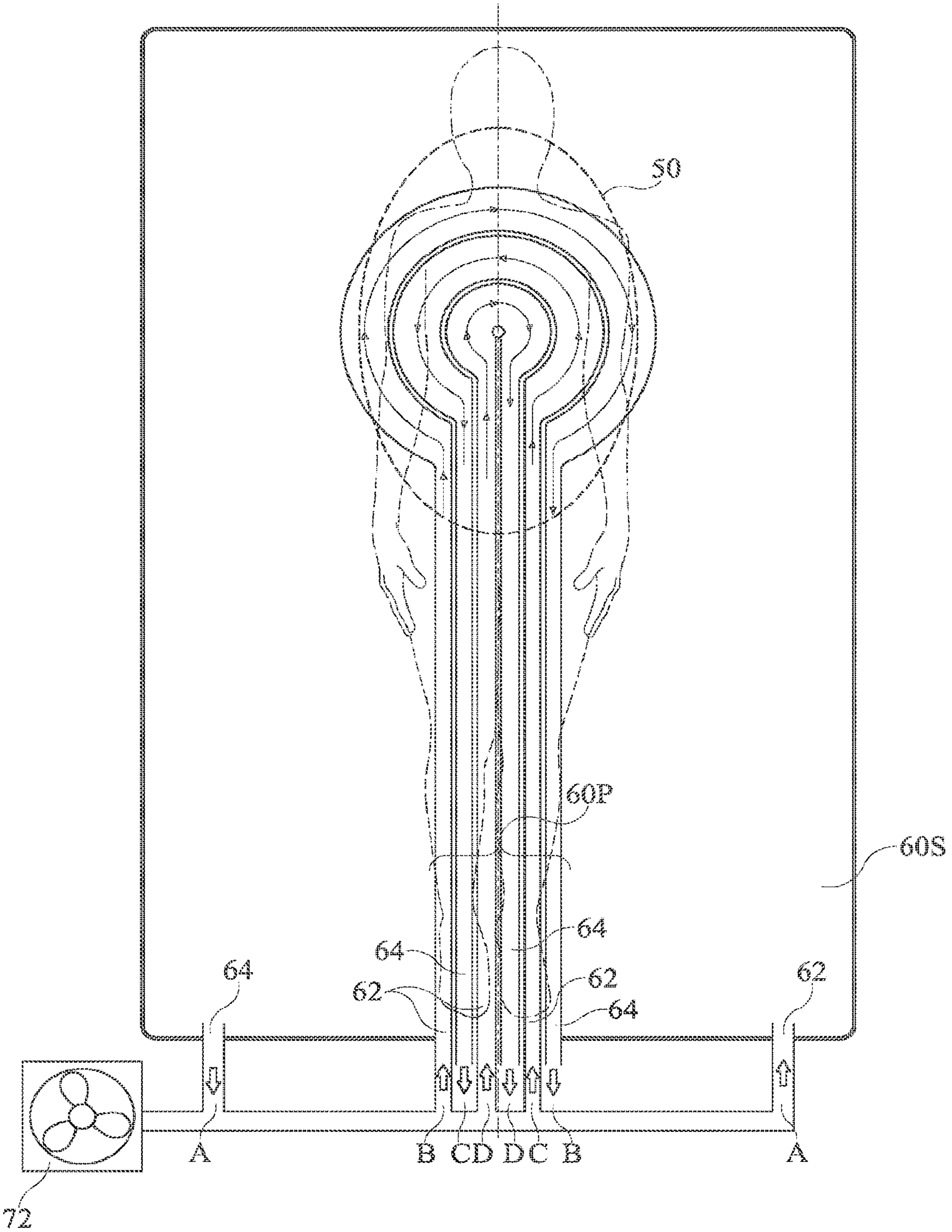
FIG. 28 is a plan view similar to that of FIG. 26 showing counterflowing keyhole passages.

FIG. 28 shows a counterflowing variant of the topper of FIGS. 26-27.

Figure 29:
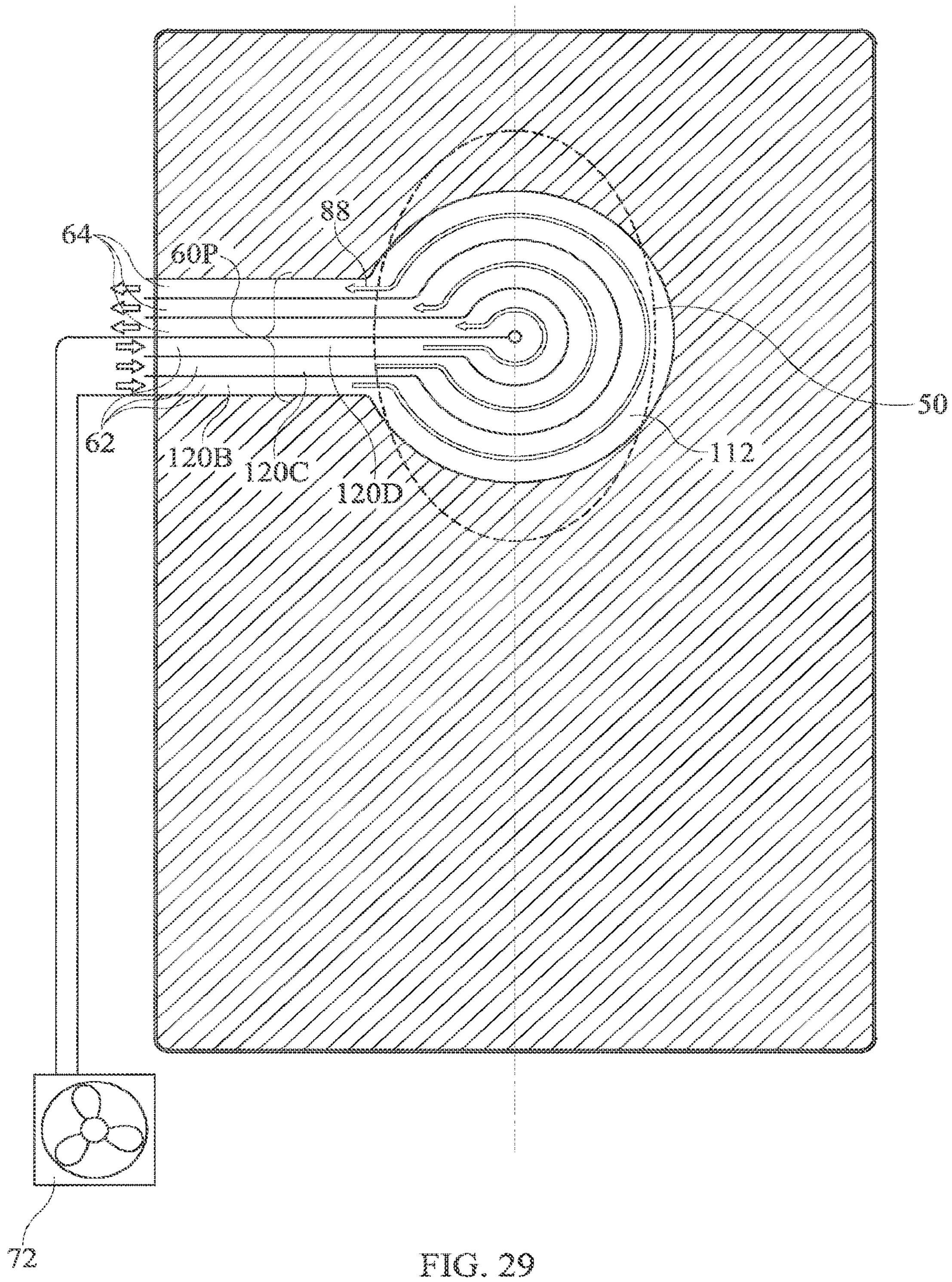
FIG. 29 is a plan view similar to that of FIG. 26 showing coflowing keyhole passages whose inlets and outlets are at the right edge of the topper.

FIG. 29 shows a topper embodiment having a coflowing, keyhole shaped principal flowpath 60P with nested passages 120 whose inlets 62 and outlets 64 are at the side of the bed rather than at a longitudinal end of the bed. The region outside the flowpath is a nonflowing region.

Figure 30:
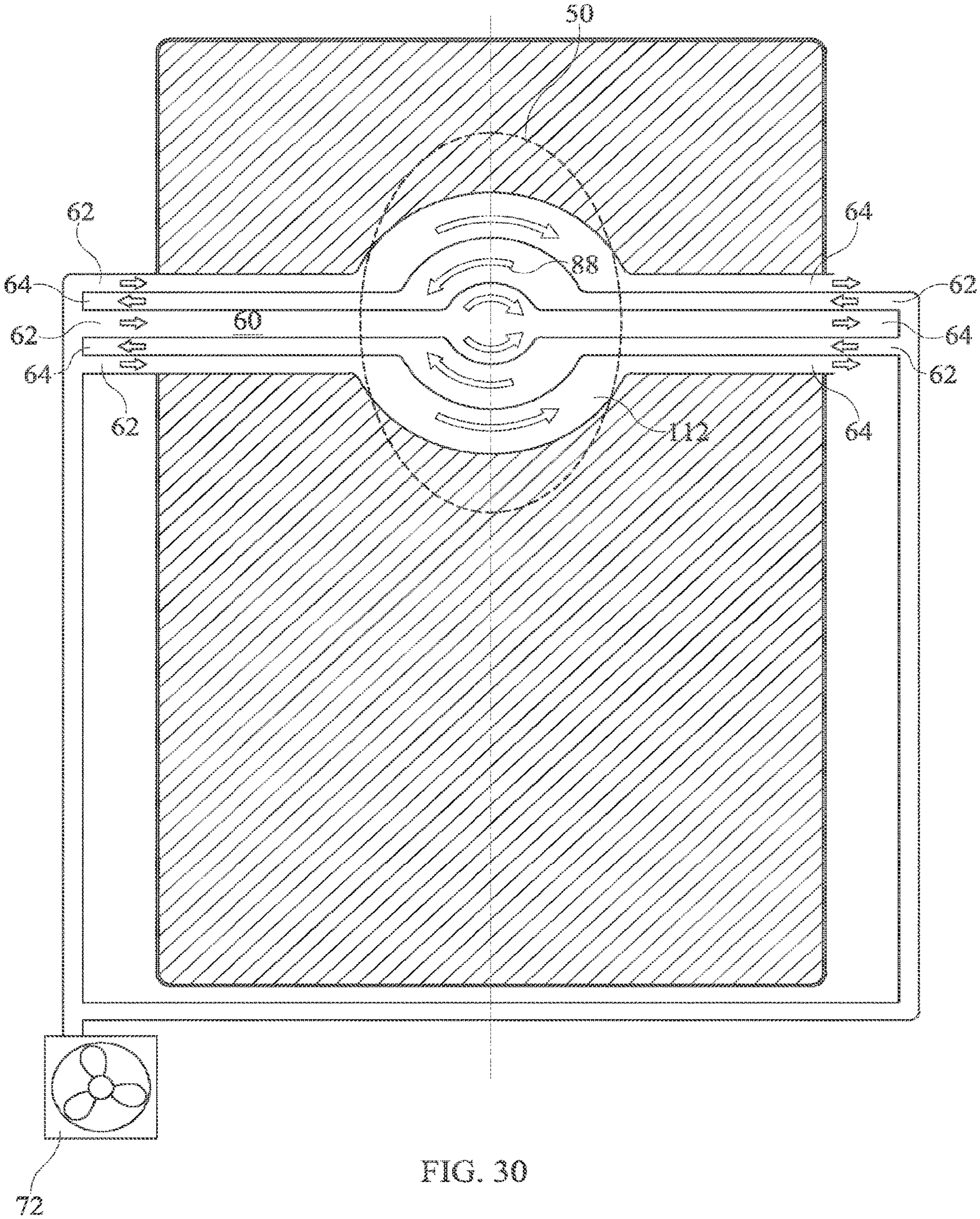
FIG. 30 is a plan view similar to that of FIG. 29 showing counterflowing, laterally extending passages with a central bulge so that the passages, taken collectively, define a two-sided keyhole configuration.

FIG. 30 shows a topper similar to that of FIG. 29 but with counterflowing, laterally extending passages having a bulging working region 112 so that the passages, taken collectively, define a two-sided keyhole configuration.

Although this disclosure refers to specific embodiments, it will be understood by those skilled in the art that various changes in form and detail may be made without departing from the subject matter set forth in the accompanying claims.

The invention claimed is:

1. A topper for a bed, the topper extending in longitudinal and lateral directions and including a fluid flowpath for channeling fluid through the topper from an inlet to an outlet, the flowpath configured to distribute the fluid to a preferred target region of the topper, wherein the topper comprises an insert enclosed by a ticking, the insert defining the flowpath with seams bounding the flowpath and separating the flowpath from margins through which the fluid does not flow, the seams defining a first lateral side, a second lateral side spaced apart from and parallel to the first lateral side, a first arched end extending between the lateral sides, and a second arched end spaced apart from the first end and extending between the lateral sides, the seams defining the flowpath as being generally arched for flow of fluid to the target region, wherein the inlet includes a first inlet positioned on the first lateral side of the insert and a second inlet positioned on a second lateral side of the insert, each of the first and second inlets connected to a respective intake conduit, the intake conduits converging such that a stream of air from each of the inlets combines together to direct air through the flowpath that includes a working region and the air exits the insert horizontally through an outlet positioned at the second end of the insert.

2. The topper of claim 1, wherein the topper has a head end, and a foot end, and the first and second lateral sides extend between the head end and the foot end.

3. The topper of claim 2, wherein the topper is coupled to a single blower that causes the stream of air from the blower to flow from the first and second inlets through the respective intake conduits.

4. The topper of claim 2, wherein the first and second inlets are each positioned closer to the first end of the insert.

5. The topper of claim 4, wherein the outlet is positioned closer to the first lateral side than the second lateral side.

6. The topper of claim 1, wherein the insert has a head end, and a foot end, and the first and second lateral sides extend between the head end and the foot end.

7. The topper of claim 1, wherein the outlet is connected to a discharge conduit obliquely aligned with the first lateral side and extending to a vent opening at a head end of the topper.

8. The topper of claim 7, wherein the discharge conduit has a width that is smaller than the distance between the first lateral side and the second lateral side.

9. The topper of claim 1, wherein the preferred target region corresponds approximately to a torso of a supine person substantially laterally centered on the topper.

10. The topper of claim 9, wherein the first and second inlets are each positioned closer to a foot end of the topper than a head end of the topper.

11. The topper of claim 9, wherein the outlet is positioned closer to the first lateral side than the second lateral side.

12. The topper of claim 1, wherein the flow of fluid into the inlets flows through the insert and out of the outlet of the topper.

13. The topper of claim 12, wherein the topper has a head end, and a foot end, and the first and second lateral sides extend between the head end and the foot end.

14. The topper of claim 13, wherein the topper is coupled to a single blower that causes the stream of air from the blower to flow from the first and second inlets through the respective intake conduits.

15. The topper of claim 13, wherein the first and second inlets are each positioned closer to the first end of the insert.

16. The topper of claim 14, wherein the outlet is positioned closer to the first lateral side than the second lateral side.

17. The topper of claim 12, wherein the insert has a head end, and a foot end, and the first and second lateral sides extend between the head end and the foot end.

18. The topper of claim 12, wherein the outlet is connected to a discharge conduit obliquely aligned with the first lateral side and extending to a vent opening at the head end of the topper.

19. The topper of claim 18, wherein the discharge conduit has a width that is smaller than the distance between the first and second lateral side.

20. The topper of claim 12, wherein the preferred target region corresponds approximately to a torso of a supine person substantially laterally centered on the topper.

* * * * *